United States Patent [19]

Nasar et al.

[11] Patent Number: 5,654,596

[45] Date of Patent: *Aug. 5, 1997

[54] LINEAR ELECTRODYNAMIC MACHINE AND METHOD OF MAKING AND USING SAME

[75] Inventors: Syed A. Nasar, Lexington, Ky.; Ion Boldea, Timisoara, Romania

[73] Assignee: Stirling Technology Company, Kennewick, Wash.

[*] Notice: The term of this patent shall not extend beyond the expiration date of Pat. No. 5,315,190.

[21] Appl. No.: 464,611

[22] PCT Filed: Dec. 21, 1993

[86] PCT No.: PCT/US93/12547

§ 371 Date: Jun. 20, 1995

§ 102(e) Date: Jun. 20, 1995

[87] PCT Pub. No.: WO94/15392

PCT Pub. Date: Jul. 7, 1994

[51] Int. Cl.$^6$ .................................................... H02K 41/00
[52] U.S. Cl. .................................................... 310/12; 310/24
[58] Field of Search .................................... 310/12, 14, 16, 310/17, 23, 24, 30, 34, 35

[56] References Cited

U.S. PATENT DOCUMENTS

| | | |
|---|---|---|
| 2,842,688 | 7/1958 | Martin . |
| 3,022,450 | 2/1962 | Chase, Jr. . |
| 3,103,603 | 9/1963 | Ruetter . |
| 3,136,934 | 6/1964 | Henry-Baudot . |
| 3,247,406 | 4/1966 | Toesca . |
| 3,259,769 | 7/1966 | Stott . |
| 3,292,065 | 12/1966 | Fredrickson . |
| 3,323,793 | 6/1967 | Brown . |
| 3,351,850 | 11/1967 | Crawford et al. . |
| 3,366,809 | 1/1968 | Scott . |
| 3,422,292 | 1/1969 | McCoy et al. . |
| 3,441,819 | 4/1969 | Palmero . |
| 3,500,079 | 3/1970 | Barthalon . |
| 3,542,495 | 11/1970 | Barthalon . |
| 3,816,776 | 6/1974 | Chari . |
| 3,891,874 | 6/1975 | Roters et al. . |
| 4,198,743 | 4/1980 | Stuber . |
| 4,210,831 | 7/1980 | Hurst . |
| 4,315,197 | 2/1982 | Studer . |
| 4,395,649 | 7/1983 | Thome et al. . |
| 4,445,426 | 5/1984 | Benson . |
| 4,445,798 | 5/1984 | Munehiro . |
| 4,501,980 | 2/1985 | Welburn . |
| 4,542,311 | 9/1985 | Newman et al. . |
| 4,546,277 | 10/1985 | Carbonneau et al. . |
| 4,602,174 | 7/1986 | Redlich . |
| 4,623,808 | 11/1986 | Beale et al. . |
| 4,697,113 | 9/1987 | Young . |
| 4,824,675 | 4/1989 | Higham et al. . |
| 4,827,163 | 5/1989 | Bhate et al. . |

(List continued on next page.)

*Primary Examiner*—Thomas M. Dougherty
*Assistant Examiner*—Jonathan Link
*Attorney, Agent, or Firm*—Bernard L. Kleinke; Peter P. Scott

[57] ABSTRACT

A linear electrodynamic machine (10) includes mover (12) and stator assemblies (14). The stator assembly (14) includes an inner stator having laminations (30–45) and an outer stator having laminations (60–75) for defining a closed loop magnetic flux path. A magnet (95) mounted on an outside portion of the stator assembly (14) produces a constant flux extending through the flux path. The inner and outer stators form at least one pair of aligned spaced apart magnetic poles (50, 80) forming a gap. A group of slugs (24) mounted on the mover assembly (12) moves into and out of the gap to interact electrodynamically with the magnetic flux within the gap. A linear electrodynamic machine (10) includes a stator assembly (14) having at least one pair of elongated stator poles (50, 80) defining a flux gap and having magnets (283A–288A) disposed thereon to interact electrodynamically with a group of slugs (24, 26) mounted on a mover assembly (12) for moving into and out of the gap. Elongated coils (50–53) are disposed on the stator poles (30–33) and are separately wound and then slipped onto their respective poles.

13 Claims, 19 Drawing Sheets

U.S. PATENT DOCUMENTS

| | | |
|---|---|---|
| 4,937,481 | 6/1990 | Vitale . |
| 4,945,269 | 7/1990 | Kamm . |
| 5,002,900 | 3/1991 | Watanabe ............................ 437/225 |
| 5,136,194 | 8/1992 | Oudet et al. . |
| 5,195,231 | 3/1993 | Fanning et al. ......................... 29/596 |
| 5,218,250 | 6/1993 | Nakagawa ............................. 310/12 |
| 5,309,050 | 5/1994 | Morinigo et al. ...................... 310/14 |
| 5,315,751 | 5/1994 | Hammer ................................. 29/598 |
| 5,406,152 | 4/1995 | Fechner et al. ......................... 310/15 |

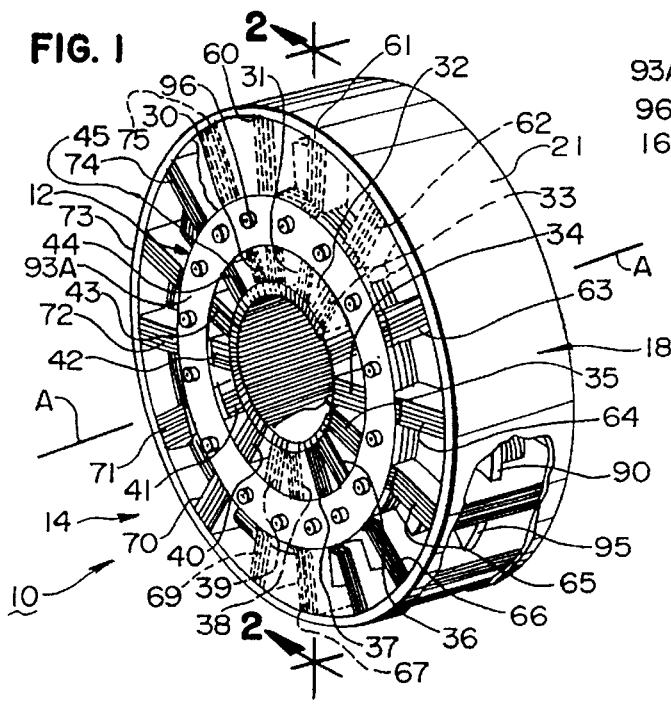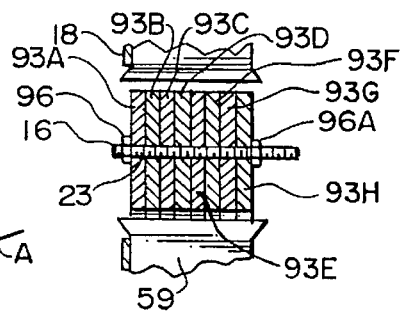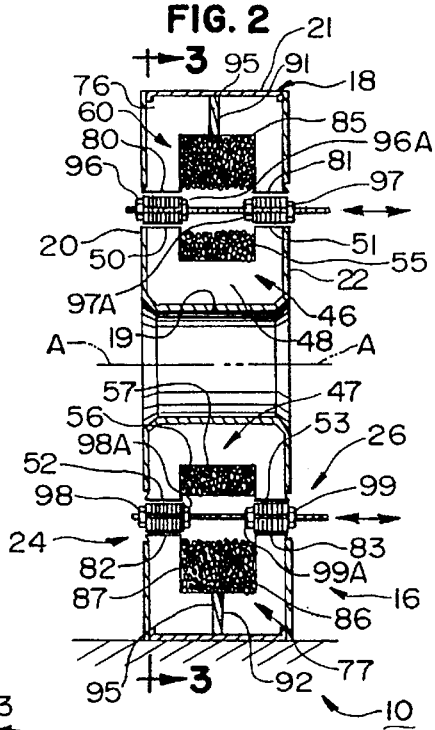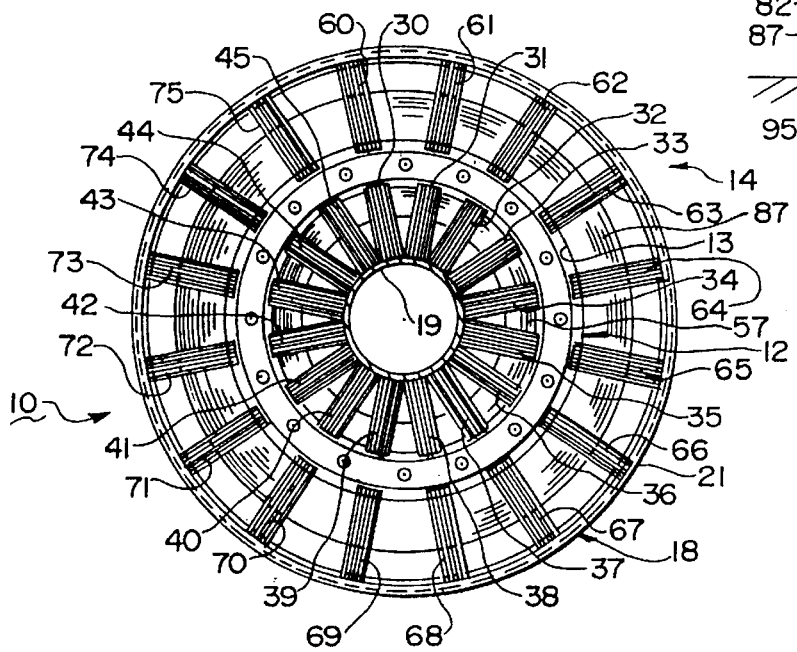

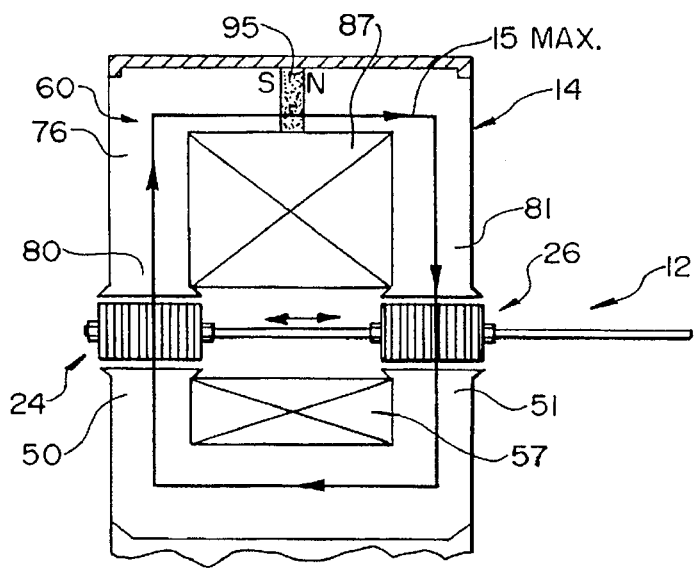
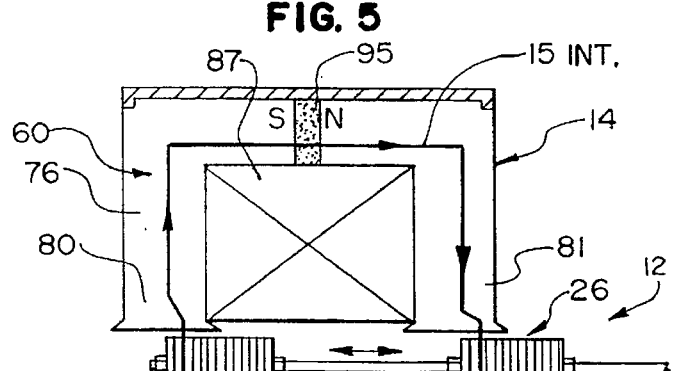
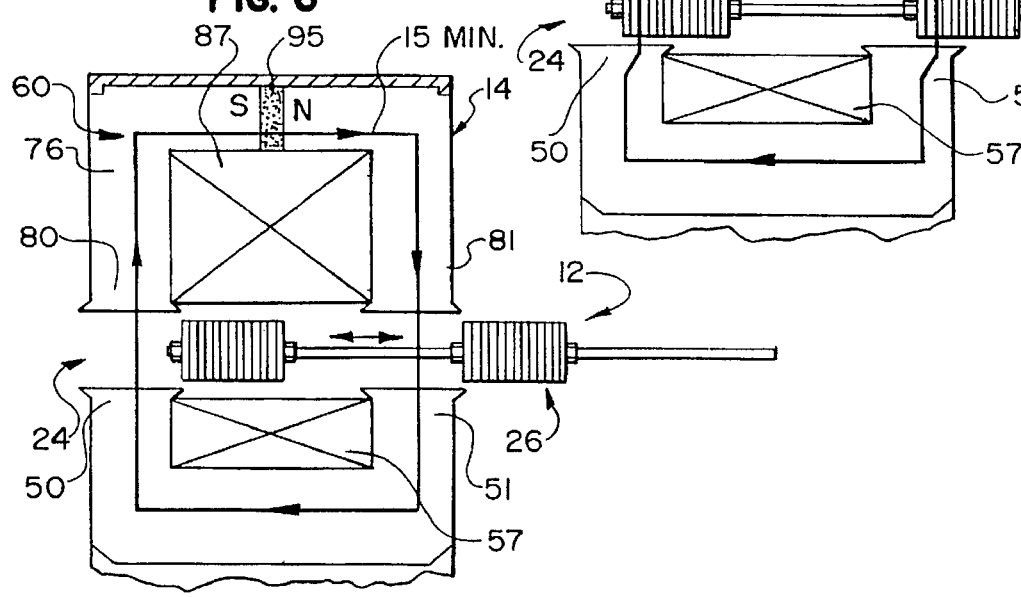

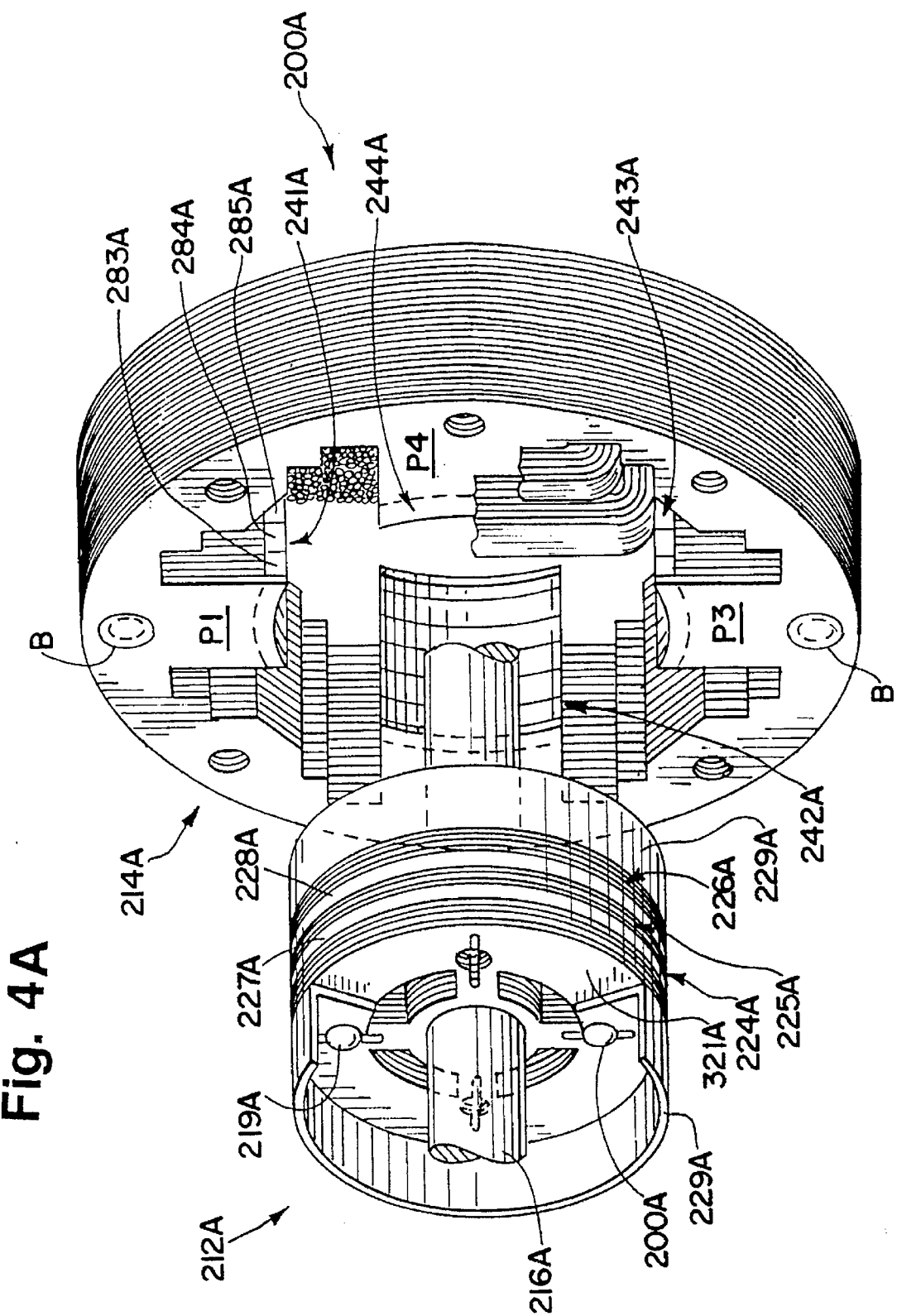

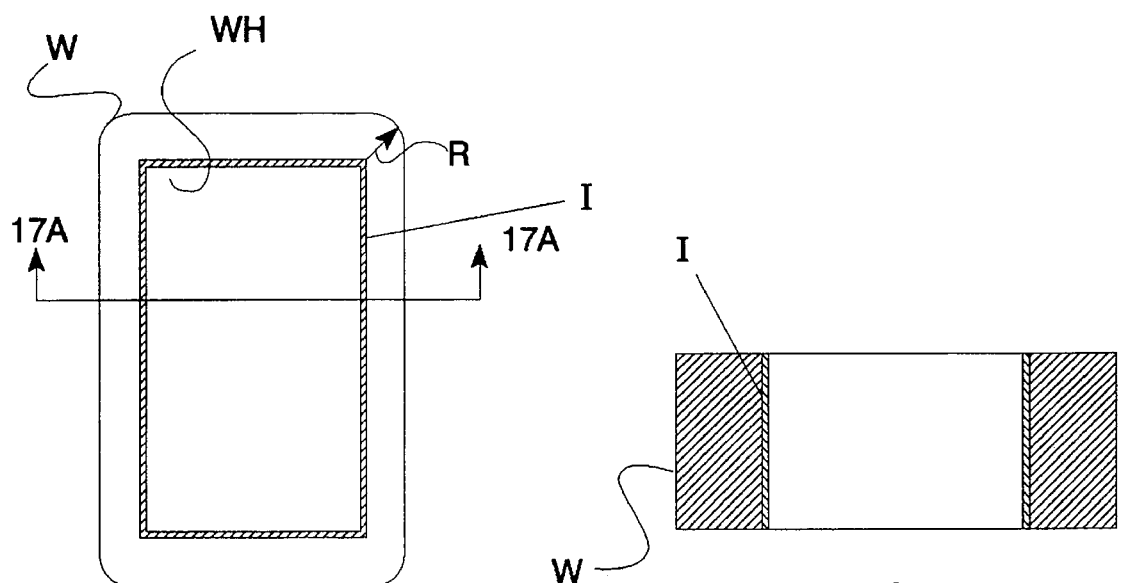
FIG. 16A
FIG. 17A
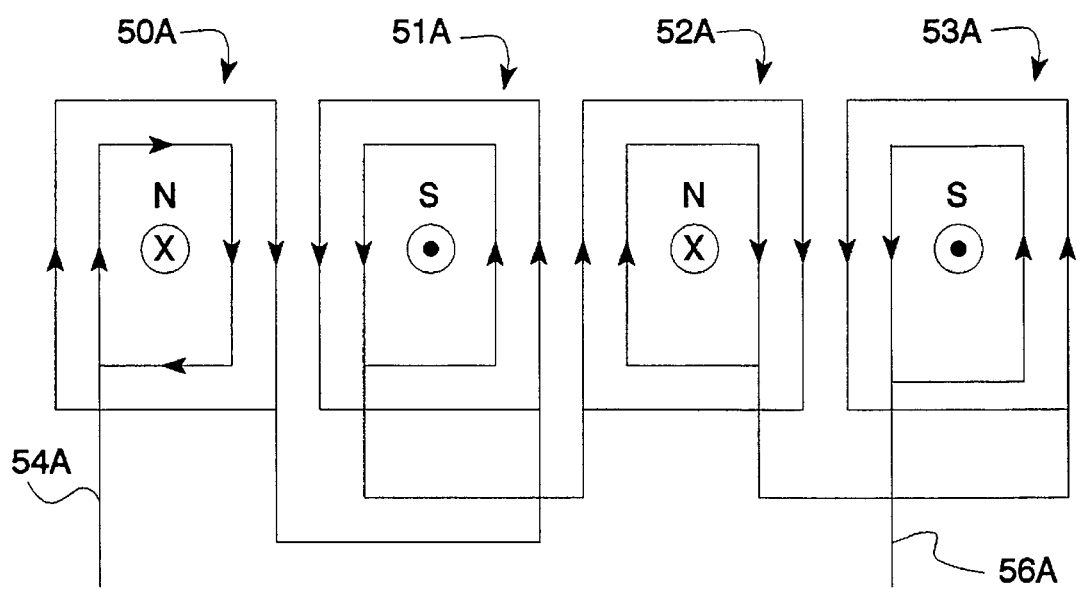
FIG. 18A

LINEAR ELECTRODYNAMIC MACHINE AND METHOD OF MAKING AND USING SAME

DESCRIPTION

1. Technical Field

The present invention relates in general to an electrodynamic machine and a method of using it. More particularly, the invention relates to a homopolar permanent magnet linear electrodynamic alternator and method of using it in a highly efficient and effective manner.

The present invention further relates in general to an improved electrodynamic machine and methods of using and constructing it. The invention more particularly relates to a linear electrodynamic machine and a method of constructing it in a cost effective and efficient manner.

2. Background Art

There have been many different types and kinds of electrodynamic machines for generating electrical currents. For example, reference may be made to the following U.S. Pat. Nos. 2,842,688; 3,022,450; 3,103,603; 3,136,934; 3,247,406; 3,259,769; 3,292,065; 3,323,793; 3,351,850; 3,366,809; 3,422,292; 3,441,819; 3,500,079; 3,542,495; 3,816,776; 3,891,874; 4,198,743; 4,210,831; 4,395,649; 4,445,798; 4,454,426; 4,542,311; 4,546,277; 4,602,174; 4,623,808; 4,642,547; 4,697,113; 4,924,675; 4,937,481; 4,945,269 and 5,136,194.

As disclosed in the foregoing patents, electrodynamic machines in the form of linear generators or alternators, generally include a stator having a predetermined number of magnetic poles for producing magnetic fields, and a mover which travels reciprocatively linearly relative to the poles. The magnetic fields are typically produced by electromagnets or permanent magnets. As the mover travels, electrical current is typically induced in the stator windings.

While such linear generators and alternators have been satisfactory for some applications, they have been relatively inefficient, due to unwanted and undesirable heat and power losses. For example, when permanent magnets are employed on the mover, heat generated by the magnets radiate radially into the machine windings, thus significantly reducing the efficiency of the operation, due the heat build-up and attendant losses.

Therefore, it would be highly desirable to have new and improved electrodynamic machine, which greatly reduces heat losses, and which is highly efficient in its operation.

Another problem associated with such prior art machines is the loss of kinetic energy from oscillating the mover relative to the stator poles. For example, the windings and permanent magnets disposed on the prior known mover are undesirably heavy. Thus, energy is wasted to reciprocate the mover, due to the excessive weight of the mover itself.

Therefore it would be highly desirable to have a new and improved electrodynamic machine, which greatly reduces the amount of energy required to reciprocate the machine mover.

Such a machine should be highly efficient and effective in its operation. Also, it should be relatively less expensive to manufacture.

It would also be highly advantageous to increase the thrust per unit weight of the machine. Such an increased power density would permit the unit to have a wider range of applications. For example, such an improved machine could be utilized for applications requiring compact configurations and where weight is a factor. Such applications can be not only linear motors and alternators, but also vibrators and actuators, such as vehicle door lock actuators. Also, where space is limited, such compact applications could include linear motors and vibrators for refrigerator compressors.

Thus, it would be highly desirable to have a new and improved linear electrodynamic machine and method of making find using it, wherein the machine would be relatively inexpensive to manufacture. Such a machine should be highly efficient by having a high thrust to weight ratio, so that it can be utilized in a wider range of applications.

DISCLOSURE OF INVENTION

Therefore, the principal object of the present invention is to provide a new and improved linear electrodynamic machine, and method of using it, whereby losses are greatly reduced to enable it to be more efficient in its operation.

Another object of the present invention is to provide such a new and improved electrodynamic machine which is highly efficient in its operation, and relatively less expensive to manufacture.

Briefly, the above and further objects are realized by providing a linear electrodynamic machine, which is highly efficient in its operation.

A linear electrodynamic machine includes mover and stator assemblies. The stator assembly includes an inner stator and an outer stator for defining a closed loop magnetic flux path. A magnet mounted on an outside portion of the stator assembly produces a constant flux extending through the magnetic flux path. The inner and outer stators form at least one pair of aligned spaced apart magnetic poles forming a gap. A group of slugs mounted on the mover assembly moves into and out of the gap to interact electromagnetically with the magnetic. flux within the gap.

In this manner, in accordance with the present invention, the magnet is disposed on the outer stator assembly to facilitate heat dissipation. The slugs on the mover are generally light in weight, to help provide a more efficient operation.

In one form of the invention, the stator and mover assemblies are flat and generally rectangularly shaped. The stator assembly is made from a plurality of axial laminations having a plurality of outer pole face members. The outer pole face members are spaced apart opposed to a corresponding set of inner pole face members and define a space therebetween for receiving the mover assembly therebetween.

Therefore, the principal object of the present invention is to provide a new and improved linear electrodynamic machine, and method of making and using it, wherein the machine is relatively inexpensive to manufacture, and has a high thrust to weight ratio.

Another object of the present invention is to provide such a new and improved electrodynamic machine which is constructed using manufacturing techniques well defined in the art and thus, making manufacture easier and relatively less expensive.

Still yet another object of the present invention is to provide a new and improved electrodynamic machine which is relatively compact in size, and constructed ruggedly.

Briefly, the above and further objects are realized by providing a linear electrodynamic machine which is highly efficient in its operation and relatively inexpensive to manufacture.

A linear electrodynamic machine includes a stator assembly having at least one pair of elongated stator poles defining a flux gap and having magnets disposed thereon to interact electrodynamically with a group of slugs mounted on a mover assembly for moving into and out of the gap. Elongated coils are disposed on the stator poles and are separately wound and then slipped onto their respective poles.

In this manner, in accordance with the present invention, the coils and magnets are disposed at the stator poles to facilitate heat dissipation. The heavy concentration of copper on the relative short stator weight.

In one form of the invention, the stator assembly is made from a plurality of radial laminations having angular slots for receiving the magnets therein to increase the gap flux density.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a partially cut away pictorial view of a linear electrodynamic machine, which is constructed in accordance with the present invention;

FIG. 2 is a diametrical sectional elevational view of the machine of FIG. 1, taken substantially on line 2—2 thereof;

FIG. 2AA is a greatly enlarged fragmentary sectional elevational view of a slug portion of the mover of FIG. 2;

FIG. 3 is a front elevational face view of the machine of FIG. 1;

FIG. 4 is a fragmentary, enlarged diagramatic transverse sectional view of the machine of FIG. 1, illustrating the mover in a leftward stroke position;

FIG. 4A is an exploded pictorial view of another linear electrodynamic machine, which is constructed in accordance with the present invention;

FIG. 5 is a diagrammatic view of the machine of FIG. 1, similar to FIG. 4 but illustrating the mover in a middle or central stroke position;

FIG. 6 is a diagrammatic view of the machine of FIG. 1, similar to FIG. 4 but illustrating the mover in a rightward stroke position;

FIG. 7AA is a magnetizing curve for the machine of FIG. 1;

FIGS. 9AA–CA are graphic representations of the per pole permanent magnet stator fluxes relative to mover position of the machine of FIG. 1A;

FIG. 16A is a coil of the machine of FIG. 1A;

FIG. 17A is a cross sectional view of the coil of FIG. 16 taken substantially on line 17A—17A thereof;

FIG. 18A is a diagrammatic representation of four stator coils connected in series.

BEST MODE FOR CARRYING OUT THE INVENTION

Figure 1A:
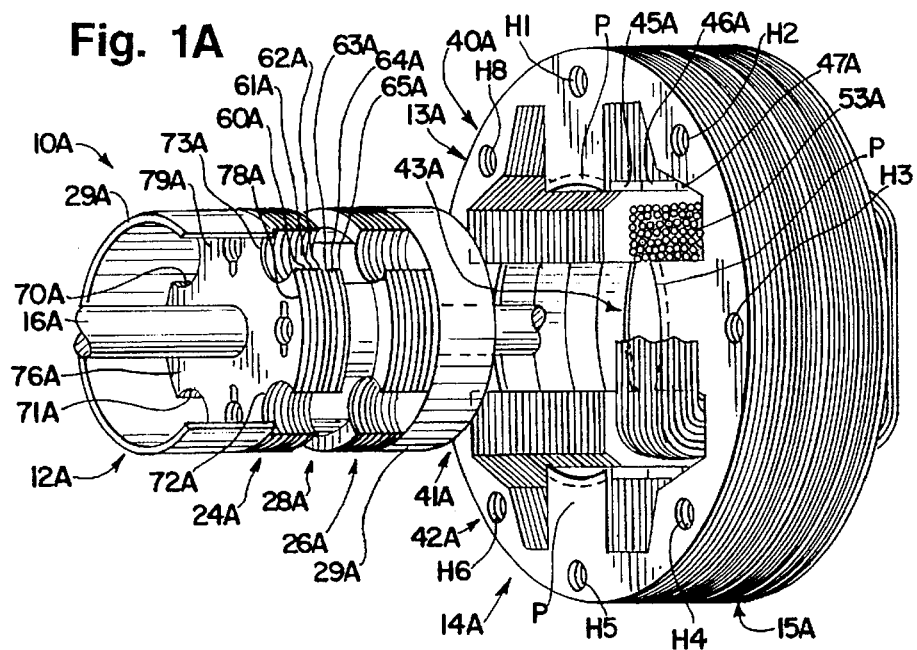
FIG. 1A is an exploded pictorial view of a linear electrodynamic machine, which is constructed in accordance with the present invention.

Referring now to the drawings and more particularly to FIGS. 1–3 thereof, there is shown a linear electrodynamic reciprocating machine 10 which is constructed in accordance to the present invention. In the preferred form of the present invention, as will be shown and described herein, the machine 10 is adapted to convert mechanical energy into electrical energy and thus, functions as a linear alternator. In this regard, the machine 10 is adapted to be driven by a free piston Stirling engine (not shown) or the like. While the preferred form of the invention is a linear alternator, those skilled in the art will understand that the machine 10 may also function as an electric motor, converting electrical energy into mechanical energy.

The electrodynamic machine 10 generally comprises an annular shaped mover assembly 12 and an annular shaped stator assembly 14 which are arranged and constructed for reciprocating axial movement relative to one another. The machine 10 also includes an annular opening or space 13 which is dimensioned for receiving the mover assembly 12 therein for substantially friction free axial movement relative to the stator assembly 14.

The mover assembly 12 coacts dynamically with the stator assembly 14 for converting mechanical energy to electrical energy. In the preferred form of the present invention, the mover assembly 12 is connected a set of connecting rods indicated generally at 16 which are attached to a rod plate (not shown) which in turn is driven by the stirling engine (not shown) for reciprocating the mover assembly 12 relative to the stator assembly 14. Thus, in the preferred form of the present invention, the machine 10 functions as a linear alternator converting mechanical energy to electrical energy. A casing 18 having a pair of annular openings 20 and 22 surrounds and protects the stator assembly 14 from hostile environments.

As best seeing in FIGS. 1-3, the mover assembly 12 generally includes two sets of spaced apart slugs or concentric ring laminations indicated generally at 24 and 26 respectively. The concentric rings are stacked relative to a common axis A and are secured to the connecting rods 16 by a series of nuts such as nuts 96–99 and 96A–99A.

Considering now the stator assembly 14 in greater detail With reference to FIGS. 1-3, the stator assembly 14 generally includes a plurality of spaced apart radially extending inner stator lamination sets 30–45 for defining a plurality of inner stator poles, such as inner stator poles and inner stator winding slots, such as inner stator poles 50–53 (FIG. 2) and inner stator winding slots 55–56. The inner stator lamination sets 30–45 are mounted to an inner portion 19 of the casing 18. In this regard, they are bonded to the inner portion 19 by any conventional bonding or welding techniques.

The stator assembly 14 also includes a plurality of spaced apart radially extending outer stator lamination sets 60–75 for defining a plurality of outer stator poles such as outer stator poles 80–83 (FIG. 2), outer stator winding slots, such as outer stator winding slots 85–86 and a plurality of magnet receiving slots, such as magnet receiving slots 90–92. The outer stator lamination sets 60–75 are mounted to an outer portion 21 of the casing 18 by any conventional bonding or welding technique.

For the purpose of producing magnetic flux, the stator assembly 14 also includes an annular shaped permanent magnet 95 which is received and mounted within the plurality of magnet receiving slots, such as the slots 90–92. The magnet 95 have an axial polarity.

As best seen in FIGS. 2 and 3, the inner stator poles such as inner poles. 50–51 are opposed spaced apart from corresponding ones of the outer stator poles such as outer poles 80–81 via the space 13. In this regard, the inner and outer poles are sufficiently spaced apart to allow the sets of annular lamination sets 24 and 26 pass therebetween for inducing a voltage across the stator assembly 14 as will be described hereinafter in greater detail.

The stator assembly 14 also includes an annular shaped inner stator winding 57 and an annular shaped outer stator winding 87 for carrying electrical current induced by the interaction between them, over assembly 12 and stator assembly 14. The inner stator winding 57 is spaced apart opposed to the outer stator winding 87 and is surrounded on three sides by the inner stator lamination sets 30–45. The outer stator winding 87 is surrounded on three sides by the outer stator lamination sets 60–75. As best seen in FIG. 2, the inner and outer stator lamination sets 30–45 and 60–75 form a plurality of closed loop magnetic flux paths that will be described in greater detail hereinafter.

Figure 6A:
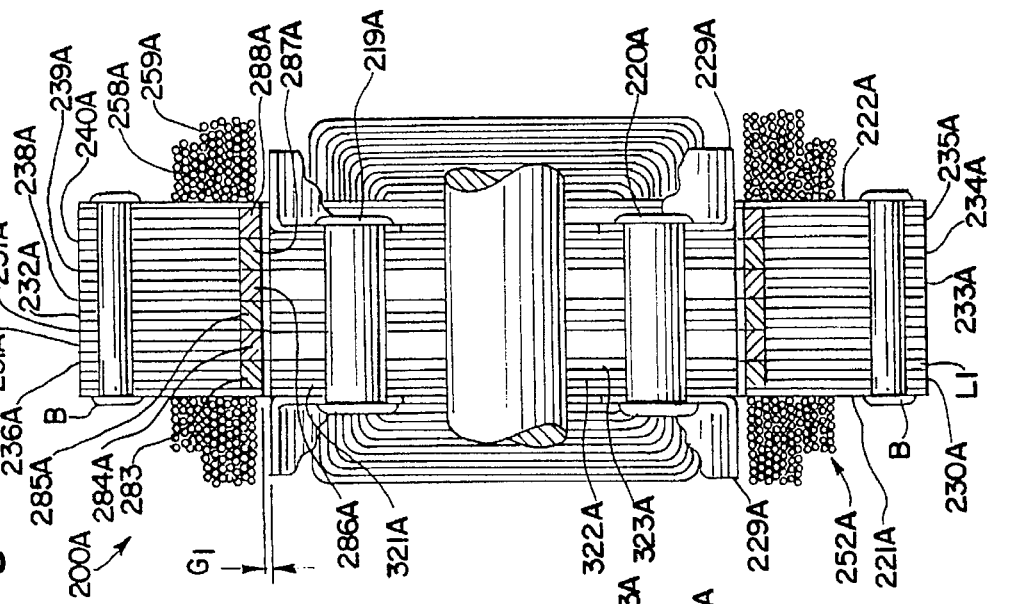
FIG. 6A is a sectional view of the machine of FIG. 5A taken substantially on line 6A—6A thereof.

In use, as best seen in FIGS. 4–6, as the mover assembly 12 is moved reciprocatively within the stator assembly 14, the amount of magnetic flux surrounding or linking the inner and outer stator windings or coils 57 and 87 respectively is changed thus, inducing a voltage in the coils 57 and 87. In this regard, the magnitude of the induced voltage is equal to the time rate of change of flux linkages of the coil.

The above described process begins as in FIG. 4 where the mover assembly 12 is illustrated in an extreme left end stroke position relative to the stator assembly 14 linking the inner and outer windings 57 and 87 with a maximum amount of flux 15 MAX traveling in a clockwise direction relative to poles 50–51 and 80–81 and with a maximum amount of flux traveling in a counter clockwise direction relative to poles 52–53 and 82–83. FIG. 6 illustrates the mover assembly 12 in an extreme right end stroke position relative to the stator assembly 14 linking the windings 57 and 87 with a minimum amount of flux 15 MIN. FIG. 5 illustrates the mover assembly 12 in a middle stroke position relative to the stator assembly, 14 linking the windings 57 and 87 with an intermediate amount of flux 15 INT.

Considering now the mover assembly 12 in greater detail with reference to FIGS. 1, 2, 2AA and 3, the sets of concentric rings 24 and 26 are substantially identical so only set 24 will be described hereinafter in greater detail.

Figure 2A:
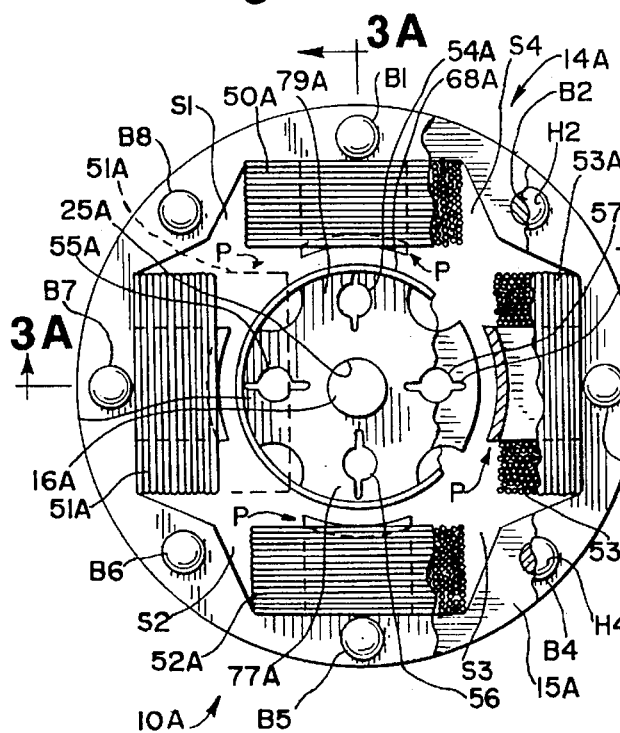
FIG. 2A is a face view of the machine of FIG. 1A, illustrating it in an assembled manner.

Referring now to FIG. 2AA, the set of concentric rings 24 includes a plurality of concentric rings 93A–93H. Each of the concentric rings 93A–93H is dimensioned for friction free movement within the annular space 13 between the inner and outer stator poles of the machine 10.

As best seen in FIGS. 1 and 2, each of the concentric rings includes a plurality of equally spaced apart mounting holes 23 dimensioned to receive therein the connecting rods 16. Each rod 16 is threaded for receiving the securing nuts thereon for helping to secure the concentric rings thereon, such as the nuts 96 and 96A for securing the rings 93A–93H to the rod 16.

Figure 7:
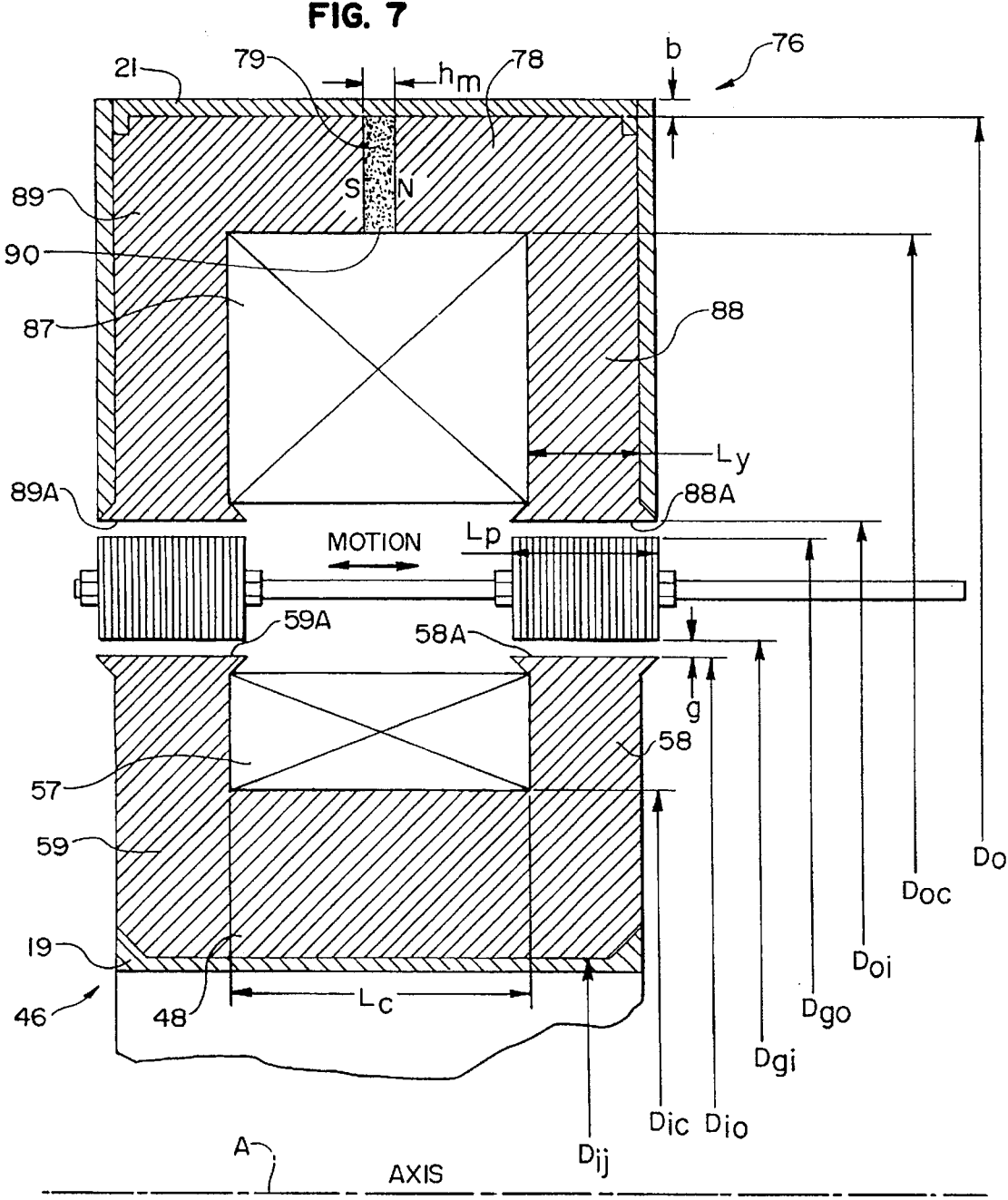
FIG. 7 is an enlarged fragmentary diagrammatic transverse sectional view of the machine of FIG. 1.
Figure 7A:
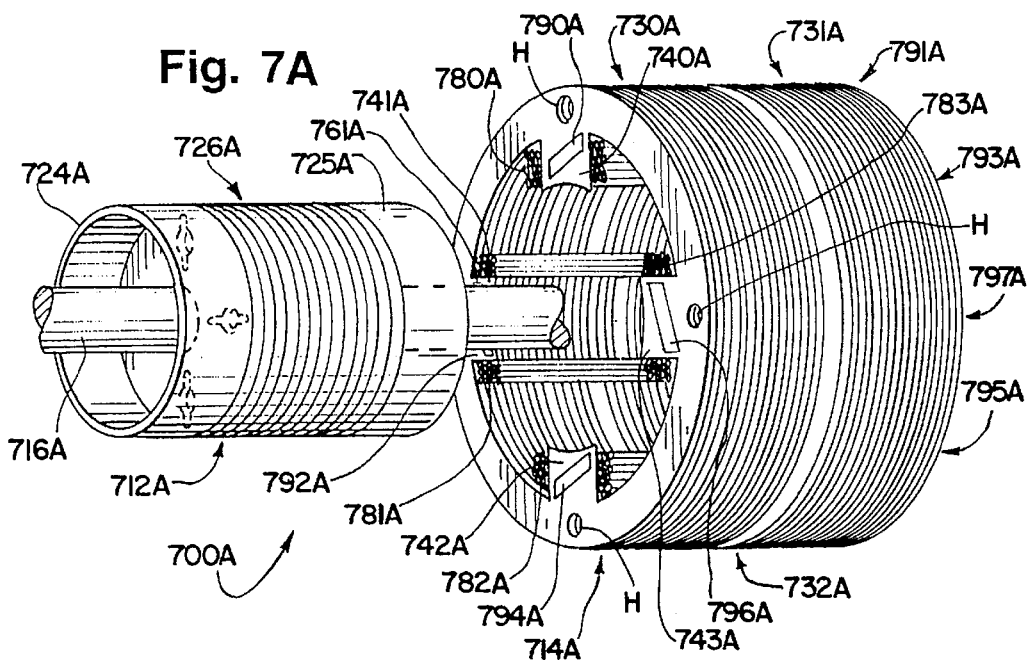
FIG. 7A is an exploded pictorial view of another linear electrodynamic machine, which is constructed in accordance with the present invention.

Referring now to FIG. 7AA, there is shown a flux density (B) verus magnetizing force (H) curve 97 illustrating the minimum and maximum amounts of flux linking the windings 57 and 87 as the mover assembly 12 reciprocates relative to the stator assembly 14. In this regard, as the mover assembly 12 and stator assembly 14 move relative to one another, electrodynamic forces are created to convert mechanical energy to electrical energy. Thus for example, when the machine 10 is coupled to a sterling engine, the interaction between the mover, assembly 12 and the stator assembly 14 produces an alternating current in the stator windings having a frequency proportional to the frequency of the rod moving the mover reciprocatively into and out of the air gaps within the machine 10. The alternating current produced by the machine 10 is shown for illustrative purpose by a curve 98.

Considering now the inner stator lamination sets 30–45 in greater detail with reference to FIGS. 2, 3 and 7, the sets 30–45 are spaced equally apart radially about the center axis A of the machine 10. In the preferred form of the present invention a total of sixteen inner lamination sets are illustrated. Those skilled in the art however will understand that a greater number or lesser number of sets may be employed so long as a corresponding greater or lesser number or outer stator lamination sets are employed. It will also be understood by those skilled in the art that both, an even or odd number of inner and outer lamination sets may be employed so long as the total number of inner and outer lamination sets equals one another. As each of the inner lamination sets 30–45 are substantially identical only set 30 will be considered in greater detail.

Considering now the inner lamination set 30 in greater detail with reference to FIGS. 2, 3 and 7, the inner lamination set 30 generally includes a plurality of U-shaped axial laminations including an individual lamination 46 which is opposed to an individual inner lamination 47 forming part of inner lamination set 38. The individual lamination within the sets, such as individual lamination 46 and 47 are substantially identical so only lamination 46 will be described in greater detail.

As best seen in FIG. 7, the inner stator lamination 46 generally includes an axial leg member 48 mounted to the inner casing portion 19. The inner axial leg member 48 is substantially parallel to the central axis A and is interconnected to a pair of inner right pole yoke and inner left pole yoke members 58 and 59 respectively. The inner right pole yoke member 58 and the inner left pole yoke member 59 are disposed substantially perpendicular to the inner axial leg member 48. The inner pole yoke members 58 and 59 are equally dimensioned and have a width $L_y$ of about 15 millimeters.

The members 58 and 59 each include a tip portion or an inner pole face portion, such as a face portion 58A and 59A which help form the inner stator poles 50 and 51 respectively. In this regard, when the individual lamination are stacked to form the set 30, the tip portions of the laminations form a pair of axially spaced apart inner stator poles, such as the inner stator poles 50 and 51, each having a predetermined inner pole face axial length substantially equal to $L_p$. The axial length $L_p$ of the inner stator pole face is about 20 millimeters.

The right pole yoke member 58 and left poke yoke member 59 are spaced apart by a distance $L_c$ which defines the axial length of the inner stator winding 57 relative to the inner stator lamination set 30. The preferred axial length $L_c$ is about 138 millimeters.

The axial length of the inner lamination set 30 is defined by the following formula:

$$L_y + L_y + L_c = \text{Inner stator axial length} \tag{1}$$

Considering now the outer stator lamination sets 60–75 in greater detail with reference to FIGS. 2, 3 and 7, the sets 60–75 are spaced equally apart radially about the center axis A of the machine 10. As each set of the outer stator lamination sets 60–75 are substantially identical only set 60 will be considered in greater detail.

Considering now the outer lamination set 60 in greater detail with reference to FIGS. 2, 3 and 7, the outer lamination set 60 is disposed opposed and spaced apart from inner lamination set 30 and generally includes a plurality of U-shaped laminations including an individual lamination 76 which is opposed to an individual outer lamination 77 forming part of outer lamination set 68. The individual laminations within the sets 60 and 68 such as the individual lamination 76 and 77 are substantially identical so only lamination 76 will be described in greater detail.

As best seen in FIG. 7, the outer stator lamination 76 generally includes an outer axial leg member 78 mounted to the outer casing portion 21. The outer axial leg member 78 is substantially parallel to the central axis A and includes a cut out portion 79 which forms part of the magnet receiving slot 90. In this regard, when the individual laminations are stacked to form the set 30, the individual cutout portions, such as the cut out portion 79 are aligned to form the magnet receiving slot 90.

The outer axial member 78 is interconnected to a pair of outer right pole yoke and outer left pole yoke members 88 and 89 respectively. The outer right member 88 and the outer left member 89 are disposed substantially perpendicular to the outer axial leg member 78. The outer pole yoke members 88 and 89 are equally dimensioned and have a width $L_y$ which is substantially equal to the width of the inner pole yoke members 58 and 59.

The outer pole yoke members 88 and 89 each include an outer tip portion or an outer pole face portion, such as an outer pole face 88A and 89A respectively which help from the outer poles 80 and 81 respectively. When the individual laminations are stacked to form the set 60, the outer tip portions of the laminations form a pair of axially spaced apart outer stator poles, such as the outer stator poles 80 and 81, each having a predetermined outer pole face axial length substantially equal to $L_p$. The axial length $L_p$ of each outer pole face, such as face 88A is substantially equal to the axial length $L_p$ of each inner pole face, such as face 58A.

The right member 88 and the left member 89 are spaced apart by a distance $L_c$ which defines the axial length of the outer stator winding 87 relative to the outer stator lamination set. The axial length of the outer stator winding 87 is substantially equal to the axial length $L_c$ of the corresponding inner stator winding 57.

The overall axial length of the outer lamination 60 is defined by the following formula:

$$L_y + L_y + L_c = \text{outer stator axial length} \tag{2}$$

Table 1 provides the preferred dimensions of the inner and outer stator laminations 46 and 76 respectively relative to FIG. 7.

TABLE 1

Design Data

| Item | Dimension |
| --- | --- |
| airgap, g | 0.4 mm |
| outer diameter, $d_o$ | 300 mm |
| See FIG. 7, $D_{oc}$ | 255 mm |
| See FIG. 7, $D_{oi}$ | 175 mm |
| See FIG. 7, $D_{go}$ | 174.2 mm |
| See FIG. 7, $D_{gi}$ | 134.2 mm |
| See FIG. 7, $D_{io}$ | 133.4 mm |
| See FIG. 7, $D_{io}$ | 93.4 mm |
| See FIG. 7, $D_{ii}$ | 33.4 mm |
| axial length of permanent magnet, hm | 5 mm |
| pole yoke, $L_y$ | 15 mm |
| pole face, $L_p$ | 20 mm |
| winding axial length, $L_c$ | 138 mm |
| total axial length, L | 168 mm |
| Number of turns of outer winding, $N_1$ | 130 |
| Number of turns of inner winding, $N_2$ | 70 |
| Total number of turns | 200 |
| Thickness of stainless steel outer shell, b | 1 mm |

Figure 8A:
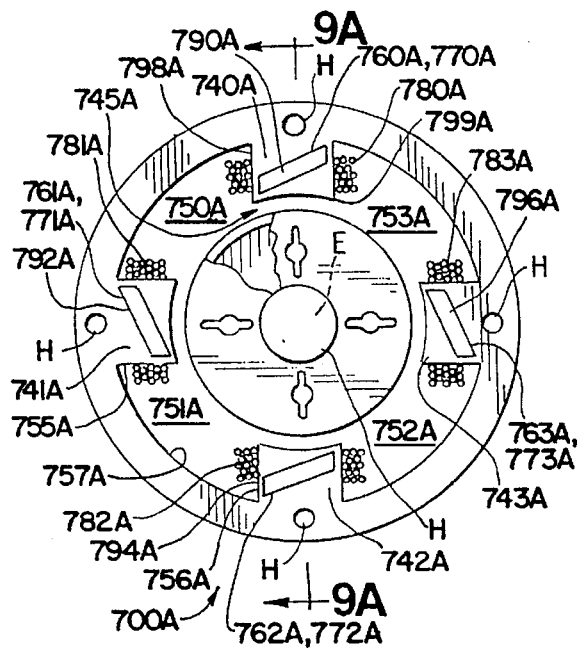
FIG. 8A is a face view of the electrodynamic machine of FIG. 7A, illustrating it in an assembled manner.
Figure 9A:
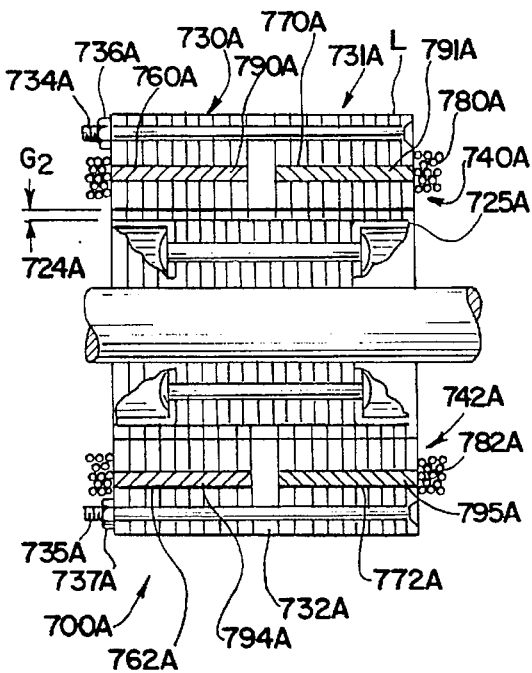
FIG. 9A is a sectional view of the machine of FIG. 8A taken substantially on line 9A—9A thereof.
Figure 7A:
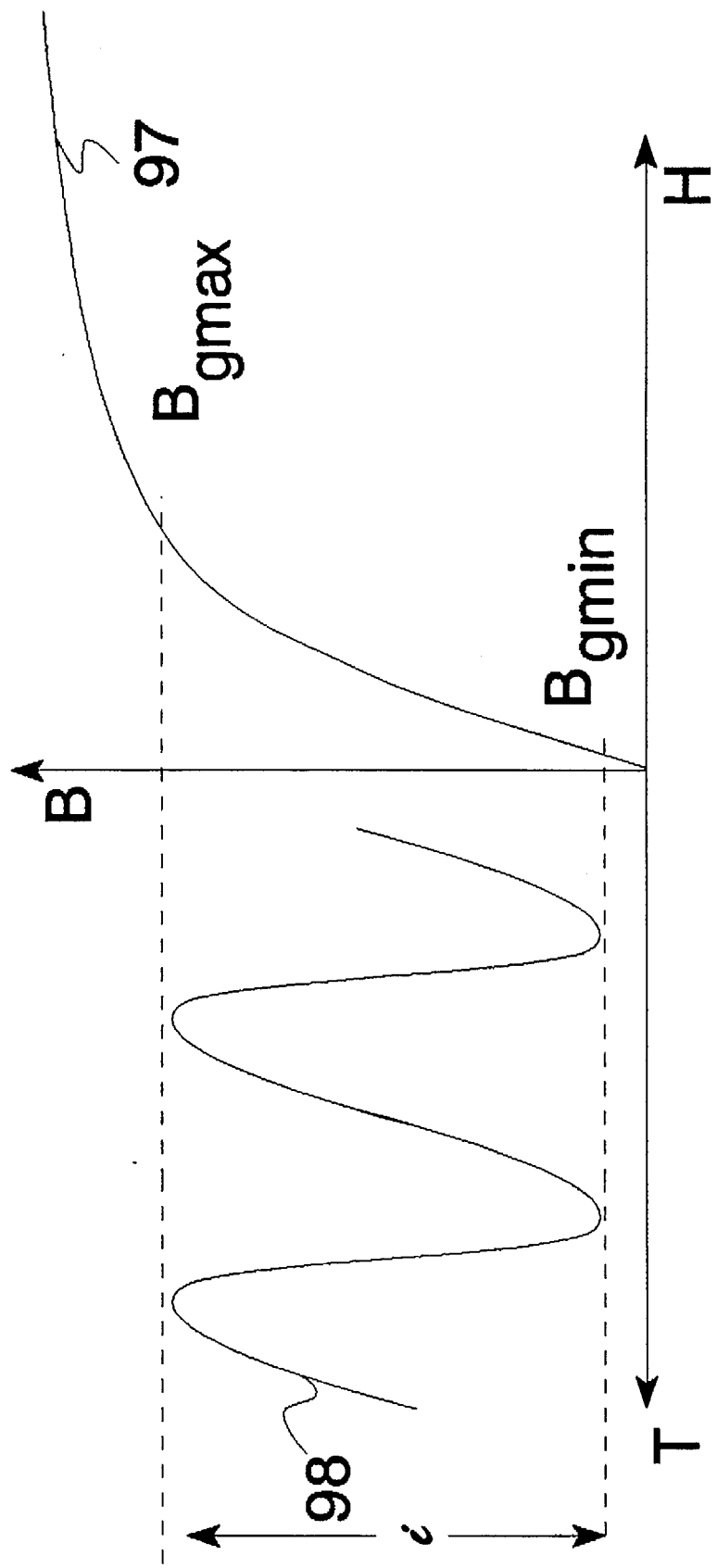
Figure 8:
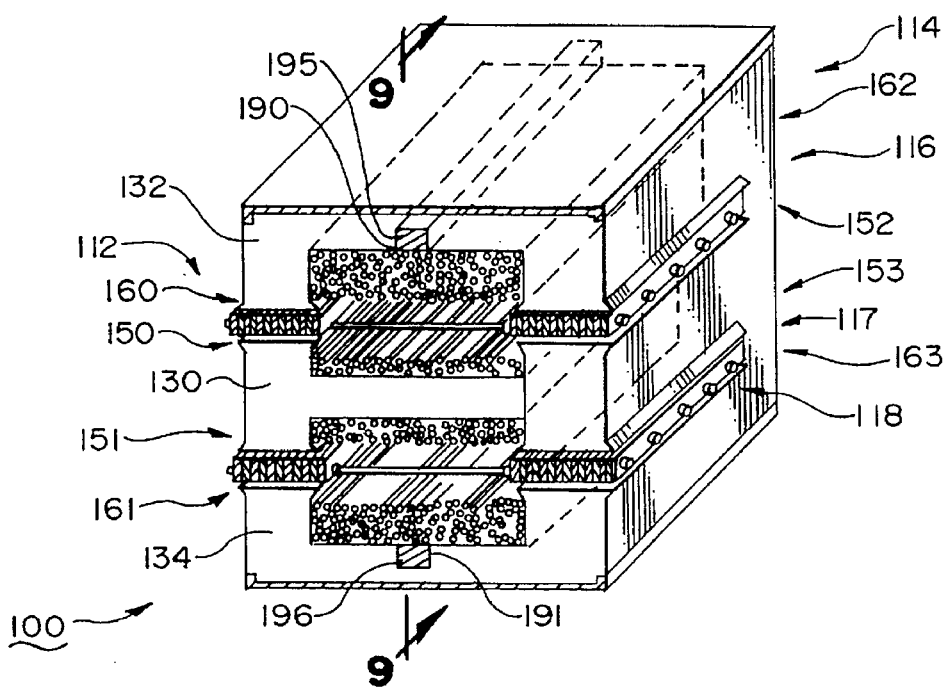
FIG. 8 is a partially cut away pictorial view another linear electrodynamic machine, which is constructed in accordance with the present invention.
Figure 9:
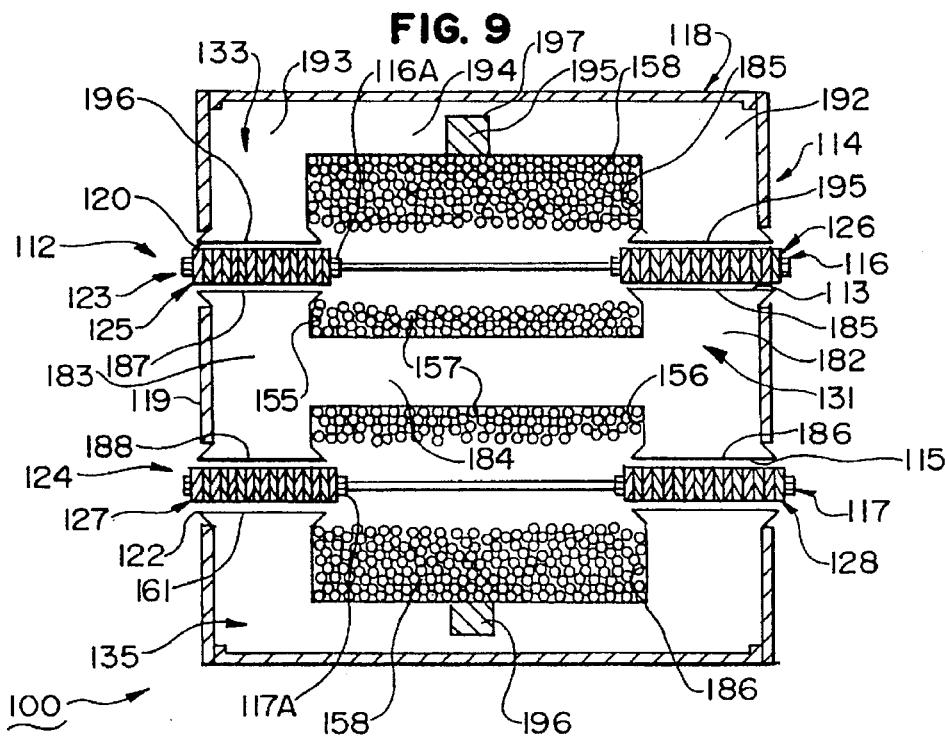
FIG. 9 is a sectional elevational view of the machine of FIG. 8, taken substantially on line 9—9 thereof.
Figure 9A:
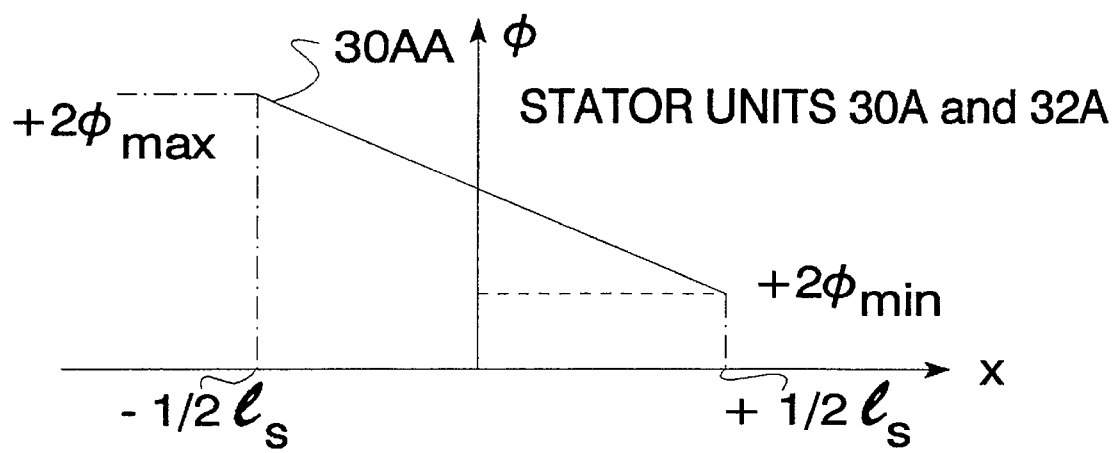

Referring now to the drawings, and more particularly to FIGS. 8 and 9 thereof, there is shown another linear electrodynamic machine 100, which is also constructed in accordance with the present invention. In the preferred form of the present invention, the machine 100 is generally flat in its shape and is adapted to convert mechanical energy into electrical energy and thus, functions as a linear alternator. In this regard, the machine 100 is adapted to be used with a free piston Stirling engine (not shown) or the like. While the preferred from of the present invention is a linear alternator, those skilled in the art will understand the machine 100 may also function as an electrical motor converting electrical energy into mechanical energy.

Similar to the cylindrical machine 10 of FIG. 1, the machine 100 has its magnetic flux produced by a permanent magnet at the outer portion of the device for advantageous heat dissipation. Also, according to the invention, slugs are used on the mover within the gap or gaps for relatively light weight operation.

The electrodynamic machine 100 generally comprises a substantially flat rectangular shaped plunger or mover assembly indicated generally at 112 and a rectangular box-like stator assembly 114 which are arranged and constructed for reciprocating movement relative to one another. The machine 100 also includes a pair of rectangular shaped openings 113 and 115 which are dimensioned for receiving the mover assembly 112 therein for substantially friction free reciprocative movement relative to the stator assembly 114.

In the preferred form of the present invention, the mover assembly 112 is connected to the stirling engine (not shown) by a set of connecting rods indicated generally at 116 and 117 for reciprocating the mover assembly 112 relative to the stator assembly 114. A casing 118 having a pair of openings, 126 and 122 surrounds and protects the stator assembly 114 from hostile environments.

As best seen in FIGS. 8 and 9, the mover assembly 112 generally includes two sets 123 and 124 of pairs of stacked groups of elongated bars or slugs indicated at 125, 126 and 127, 128 respectively. The stacked slug groups 125, 126 and 127, 128 are secured to the rods 116 and 117 respectively by sets of nuts, such as sets 116A and 117A, respectively.

Considering now the stator assembly 114 in greater detail with reference to FIGS. 8 and 9, the stator assembly 114 generally includes an I-shaped inner stator unit 130 and a pair of U-shaped outer stator units 132 and 134 which are disposed spaced apart on opposite sides of the inner stator unit 130 via the openings 120 and 122 respectively.

The inner stator unit 130 include a plurality of inner stator laminations including for example, a lamination 131 for defining a plurality of inner stator poles 150–153 and a pair of inner stator winding slots 155–156. The inner stator laminations are mounted to an outer portion 119 of the casing 118. In this regard, they are bonded to the outer portion 119 by any conventional bonding or welding technique.

The outer stator units 132 and 134 include plurality of outer stator laminations, including for example a lamination 133 and 135 respectively for defining a plurality of pairs of outer stator poles 160, 161 and 162, 163 respectively. As the outer stator units 132 and 134 are otherwise substantially identical, only outer stator unit 132 will be described hereinafter in greater detail.

Considering now the outer stator unit 132 in-greater detail with reference to FIGS. 8 and 9, the outer stator assembly 132 generally includes a plurality of U-shaped outer stator laminations for defining the outer stator poles 160, 161 and an outer stator winding slot 185. The outer stator laminations of the outer stator assembly 132 are stacked in alignment for defining a centrally disposed magnet receiving slot 190. A corresponding magnet receiving slot 191 is disposed in the outer stator assembly 134. In this regard, a pair of elongated magnets 195 and 196 are disposed in slots 190 and 191 respectively for producing magnetic flux. The outer stator laminations of assembly 132 are bonded to the outer portion 119 of the casing by any conventional bonding or welding techniques.

Figure 10:
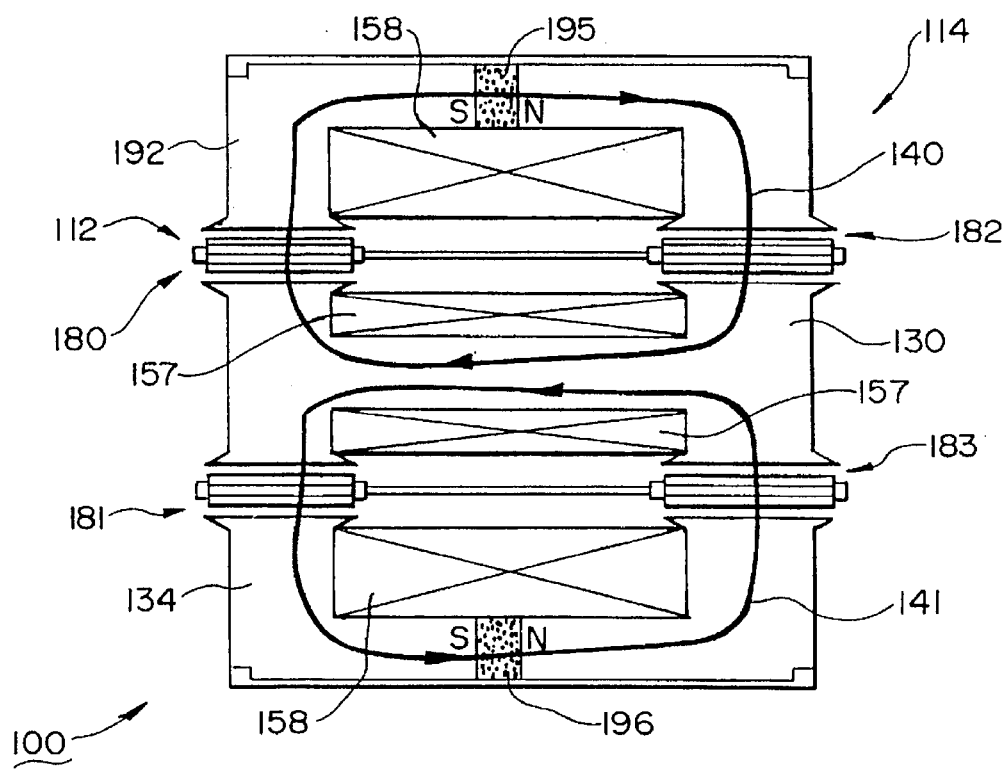
FIG. 10 is an enlarged diagrammatic transverse elevational view of the machine of FIG. 8, illustrating the mover in a central or middle stroke position

As best seen in FIG. 10, the magnet 195 produces a magnetic flux which flows in a clockwise direction along a closed loop magnetic flux path indicated generally at 140, while the magnet 196 produces magnetic flux which flows in a counter clockwise direction along another closed loop magnetic flux path indicated generally at 141. In order to enable the magnetic flux produced by magnets 195 and 196 to flow along closed loop paths 140 and 141 respectively, the inner stator poles 150, 151 and 152, 153 are disposed opposite the outer stator poles 160, 161 and 162, 163 respectively. A set of air gaps or spaces, 180, 181 and 182, 183 separate the poles which are disposed opposite from one another.

The stator assembly 114 includes an inner stator winding or coil 157 disposed in slots 155 and 156 and an outer stator winding or coil 158 disposed in slots 185 and 186. The stator windings 157 and 158 are connected electrically together for carrying electrical current induced by the interaction between the mover assembly 112 and the state or assembly 114.

Figure 11:
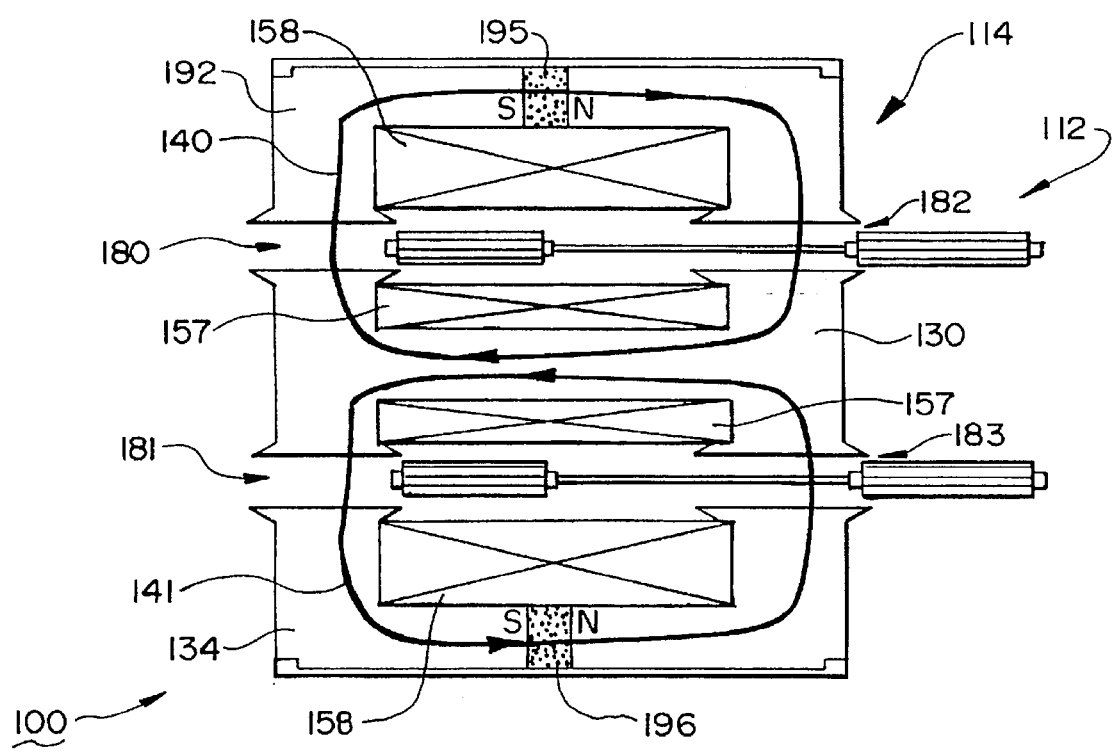
FIG. 11 is a diagrammatic view of the machine of FIG. 8, similar to FIG. 10 but illustrating the mover in a rightward stroke position.

As best seen in FIGS. 10 and 11, the inner stator winding 157 and outer stator winding 158 are each surrounded by the, closed, loop magnetic flux paths 140 and 141. In this regard, as the mover assembly 112 is oscillated reciprocatively rectilinearly within the stator assembly 114, the amount of magnetic flux surrounding or linking the inner and outer stator windings 157 and 158 respectively changes, thus inducing a voltage in the windings 157 and 158. In this regard, the magnitude of the induced voltage is equal to the time rate charge, of flux linkages of the windings 157 and 185.

Considering now the plurality of inner stator lamination in greater detail, only inner lamination 131 will be described in greater detail as each of the laminations are substantially identical.

Referring now to FIG. 8, the inner lamination 131 has a unitary construction and generally includes a right leg member 182 and a left leg member 183 which are integrally connected by an intermediate leg member 184. The right leg member 182 and the left leg member 183 are spaced apart by the intermediate leg member 184 to help define the inner winding receiving slots 155 and 156 respectively.

The right leg member 182 includes a pair of inner pole faces 185 and 186 respectively which help define the inner stator poles 152 and 153 respectively. The left leg member 183 also includes a pair of inner pole faces 187 and 188 respectively which help define the inner stator poles 150 and 151 respectively.

Considering now the outer stator units 132 and 134 in greater detail, only lamination 133 will be described in greater detail, as each of the outer stator laminations are substantially identical.

Referring now to FIG. 9, the outer stator lamination 133 has a unitary construction and generally includes a right leg member 192 and a left leg member 193 which are integrally connected by an intermediate leg member 194. The right leg member 192 and the left leg member 193 are spaced apart by the intermediate leg member 194 to help define the outer stator winding slot 185.

The right leg member 192 includes an outer pole face 195 which helps define the outer pole 162. The left leg member 193 includes an outer pole face 196 which helps define the outer pole 160. Each of the outer pole faces. 195 and 196 are disposed opposite the corresponding inner pole faces 185 and 187 respectively.

The intermediate leg member 194 includes a cut-out portion 197 which helps define the magnet receiving slot 190.

The reciprocation action of the mover assembly 112 relative to the stator assembly 114 is illustrated in FIGS. 10 and 11. FIG. 10 illustrates the mover assembly 112 and stator assembly 114 in a maximum flux position. FIG. 11 illustrates the mover assembly 112 and stator assembly 114 in a minimum flux position. As the reciprocative action of machine 100 is similar to machine 10 and will not be described further.

Referring now to the drawings, and more particularly to FIGS. 1A–3A thereof, there is shown a linear electrodynamic machine 10A, which is constructed in accordance with the present invention. The machine 10A can be readily constructed and used in accordance with the methods of the present invention.

The electrodynamic machine 10A in the preferred form of the present invention, as will be shown and described herein, can function as a linear motor, alternator, vibrator or actuator. The preferred form of the invention is a linear motor, such as one adapted for driving a refrigerator compressor.

Figure 3A:
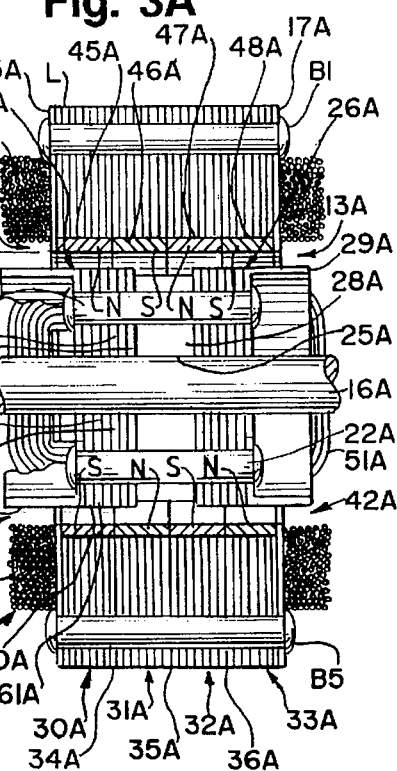
FIG. 3A is a sectional view of the machine of FIG. 2A taken substantially on line 3A—3A thereof.

The electrodynamic machine 10A generally comprises a cylindrically shaped mover assembly 12A and cylindrically shaped stator assembly 14A which are arranged and constructed in a concentric, telescoping manner as shown in FIGS. 2A and 3A, for reciprocating axial movement relative to one another. The stator assembly 14A includes a central opening or space 13A which is dimensioned for receiving the mover assembly 12A therein for substantially friction free axial movement relative to the stator assembly 14A.

The mover assembly 12A coacts dynamically with the stator assembly 14A for converting electrical energy to mechanical energy. In the preferred form of the present invention, the mover assembly 12A is connected to a rod 16A for transferring the mechanical energy to a selected apparatus, such as a refrigerator compressor (not shown).

As best seen in FIGS. 1A–3A, the stator assembly 14A includes a set of spaced apart axial holes, H1–H8, which are adapted to receive therein, a set of bolts, B1–B8 for helping to fix together a set of laminations forming the stator. For clarity of understanding the construction of the machine 10A, the mounting bolts B have been omitted from FIG. 1A.

Considering now the mover assembly 12A in greater detail, the mover assembly 12A is generally dumb bell shaped, and includes two spaced apart annular shaped slug or lamination groups indicated generally at 24A and 26A respectively. The slug groups 24A and 26A includes a centrally disposed hole, such as the hole 25A (FIG. 2A) extending the entire axial length of the mover assembly 12A to permit the mounting of the slug groups 24A, 26A onto the rod 16A.

A light weight cylindrical spacer 28A is disposed between the slug groups 24A and 26A in order to separate the slug groups by a distance $1_s$ and to help in the assembly of the slug groups on the rod 16A. The spacer 28A is composed of a suitable nonmagnetic, nonconductive material in order to help facilitate proper electromagnetic interaction between the mover assembly 12A and the stator assembly 14A.

A pair of light weight, nonmagnetic nonconductive collars 29A and 29AA, in cooperation with a corresponding set of mounting bolts, such as bolts 21A and 22A (FIG. 3A) help secure the slug groups 24A and 26A and the spacer 28A in a stationary position on the rod 16A. For clarity purposes, the mover mounting bolts are not shown in FIGS. 1A and 2A. However, those skilled in the art will understand from FIGS. 1A and 2A that four mounting bolts are utilized in the preferred form of the present invention.

Considering now the stator assembly 14A in greater detail with reference to FIGS. 1A–3A, the stator assembly 14A generally includes four sets of stacked stator lamination units indicated generally at 30A–33A, respectively. As best seen in FIG. 3A, the set of laminated stator units 30A–33A are bolted together, thus helping to reduce copper losses and facilitating small end connections.

Each stack of stator laminations, such as the stacked laminations 30A, includes a plurality of annular laminations, such as the lamination L for helping to define a portion of a plurality of spaced apart elongated stator poles P and a plurality of spaced apart elongated winding slots S1–S4, respectively. By the use of the radial laminations, no additional housing, or casing is required in the radial direction.

With reference to FIG. 3A, each laminated unit 30A–33A has a plurality of poles, such as the circumferentially spaced apart poles P. The four poles define a pole group. Each one of the poles has a permanent magnet, such as the magnet 45A, mounted on its face. The magnets alternate in polarity.

The four units are arranged with the pole groups alternating in polarity axially, such that there are four groups of four poles in the machine 10A. There are four pole groups, and each pole group has four poles. In this regard, the magnets of the pole groups are aligned axially in magnet sets 40A–43A, where each magnet set, such as the set 40A, includes magnets, such as magnets 45A–48A, which alternate in polarity axially.

Adjacently disposed magnet sets, such as the set 42A, has its magnet arranged in opposite polarity relative to the adjacently disposed set, such as the set 40A.

Although in the preferred form of the present invention, four sets of stacks of stator lamination units are shown, it will be understood by those skilled in the art, that a greater or lesser number of stacks may be employed depending upon the outside diameter restraints imposed on the machine in its given environment. For example, in connection with one preferred form of the machine 10A, the following dimensions are employed:

Outside Diameter=$D_{se}$=102 mm
Rod Diameter=$D_s$=10 mm
Total Available Axial Length=l=100 mm
Stroke Length (end to end) $l_s$=10 mm
Rated Input=$V_n$=110 volts(rms) at 60 $H_z$.
Rated Output Power=$P_n$=240 watts
Direct 110 volts Starting As best seen in FIGS. 1A–3A, the stator assembly 14A includes the four sets of permanent magnets 40A–43A for inducing a flow of magnetic flux in each of the stator poles P. In order to reduce the permeance to stray fields, the respective sets 40A–43A of magnets are mounted at their respective stator poles in an airgap g extending between the mover assembly 12A and the stator poles P.

The permanent magnetic flux induced by each respective set of magnets in its associated stator sections such as the magnet set 40A varies from a minimum flux value $\phi_{min}$ in to a maximum flux value $\phi_{max}$ as will be described hereafter in greater detail.

The stator assembly 14A further includes a set of stator windings or coils indicated generally at 50A–53A respectively. Each stator winding, such as stator winding 50A, is disposed in a pair of the winding slots, such as slots S1 and S4 and is mounted axially on an associated set of the stator poles P. For clarity purposes only stator coil 51A is shown in FIG. 1A.

Figure 9B:
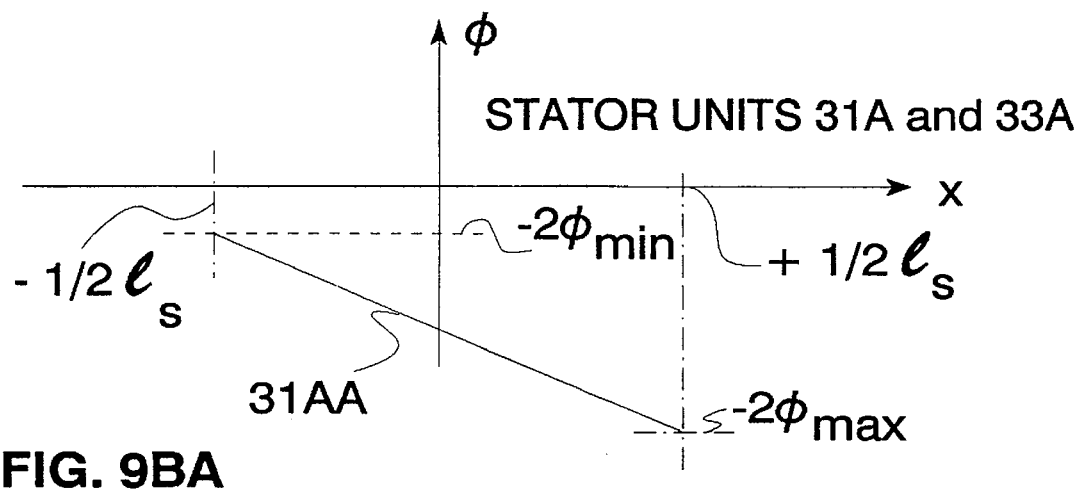

As will be explained hereinafter in greater detail, the permanent magnet flux in each of the four stator segments 30–33A varies from a minimum flux of $\phi_{min}$ to a maximum flux $\phi_{max}$ depending upon the relationship between the slug groups 24A and 26A and the stator poles P. In this regard, with reference to FIGS. 9AA–9CA, for two stator units, for example stator units 30A and 32A, the permanent magnet (PM) flux is positive (N-polarity) as shown in FIG. 9AA, while in the other two stator units the permanent magnet flux is negative (S-polarity) as shown in FIG. 9BA, for example in stator units 31A and 33A. The total flux per pole P in a given one of the coils, such as the coil 50A varies between $+2(\phi_{max}-\phi_{min})$ and $-2(\phi_{max}-\phi_{min})$ as shown in FIG. 9CA.

Referring now to FIG. 9AA there is shown a positive permanent magnet flux curve 30AA illustrating the permanent magnet flux φ in the stator pole as a function of the stroke length of the mover. FIG. 9BA shows a negative permanent magnet flux curve 31AA, while FIG. 9CA shows a permanent magnet flux curve 50AA illustrating the permanent magnetic flux φ induced in the coil associated with the pole P.

Figure 9C:
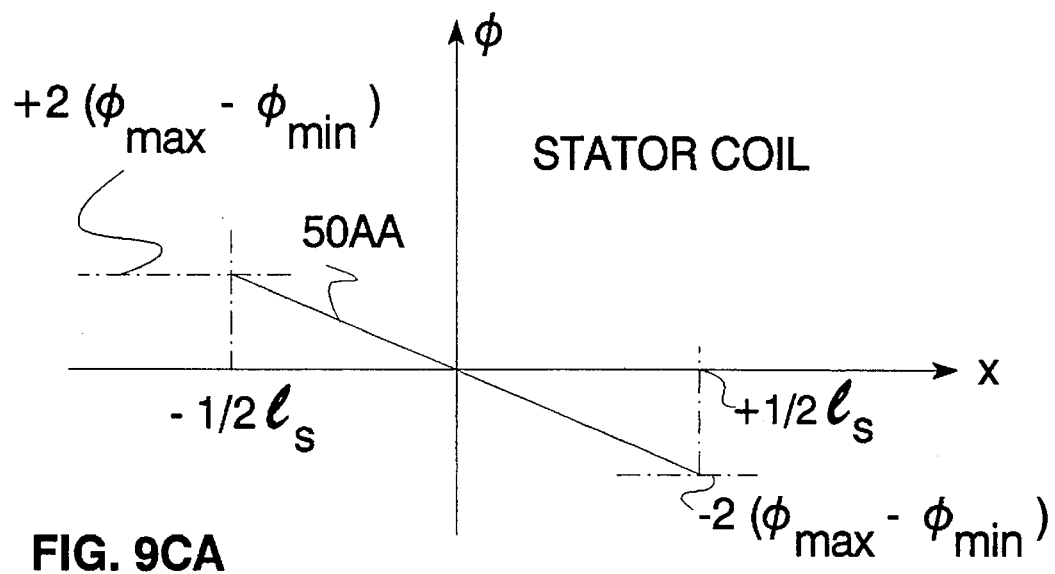

From FIG. 9CA it can be seen that the PM flux is zero in the middle of the stoke. With negligible saturation, it can be assumed a linear variation of flux occurs as a function of mover position. Thus, by assuming a harmonic motion it can be stated:

$$x = \frac{1}{2} l_s \sin w_1 t \tag{3}$$

The total induced voltage therefore with four coils connected in series is given by:

$$E_a = \delta(\phi_{max} - \phi_{min}) N_c w_1 \cos w_1 t \tag{4}$$

The rms value of the induced voltage is $$E_a = 35.538 f_1 (\phi_{max} - \phi_{min}) N_c \tag{5}$$

where $N_c$ equals the number of turns per coil.

The magnetic airgap g of the machine 10A is assumed for example purposes, to be about 0.4 mm. However, as shown in FIG. 1A, end plates, such as the end plates 29A and 29AA, have been added to the mover assembly 12A. Similarly a set of end plates, 15AA and 17AA (FIG. 3AA), have been added to the stator assembly 14A, to avoid a contact between the magnets and mover owing to the forces arising from any eccentricity. A clearance C of about 0.3 mm is desired between the end plates. For clarity purposes, end plates 15AA and 17AA are not shown in FIG. 1A.

Figure 14A:
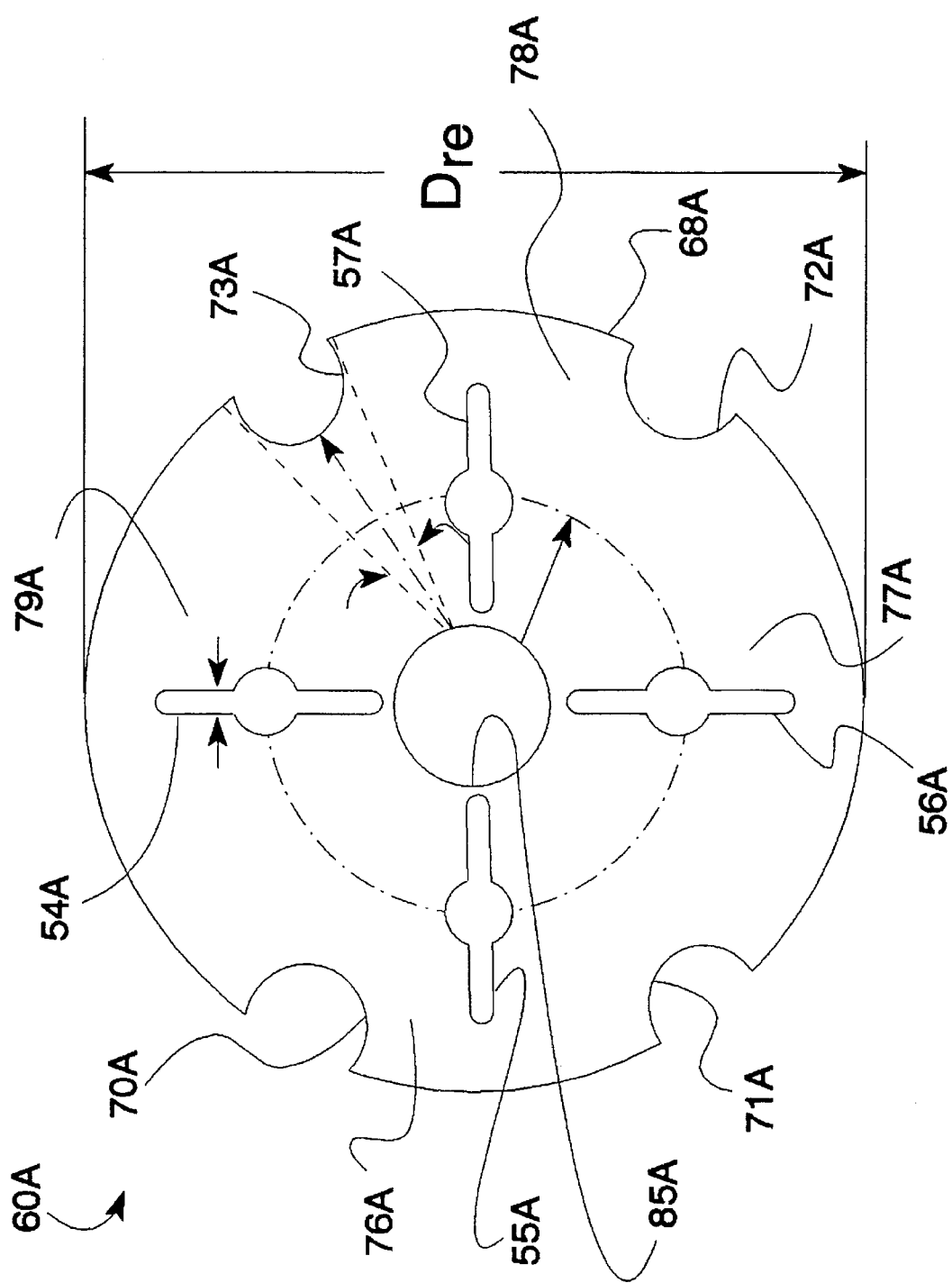
FIG. 14A is a single mover lamination of the mover of FIG. 1A.

For illustration, axially, the mover 12A, includes three segments between end plates 29A and 29AA (the two slug groups and the spacer 28A where each segment has a length $l_s$ in the axial direction. As best seen in FIGS. 14AA and 15AA, the outer diameter ($D_{re}$) of the mover 12A is approximately one-half of the outer diameter ($D_{er}$) of the stator. In this regard $D_{er}$ is about 102 mm and $D_{re}$ is about 50 mm. Based on the foregoing, a window area of about 12×16=192 mm² is available for each coil, which must be preformed. Such an arrangement lends to ease of manufacture and repair. In order to limit saturation, the core flux density is not allowed to exceed 1.4 T except in some "bottleneck" regions. In the mover 12A, the flux density changes sign but the core losses will be small since the alternating current component of the flux density is small. Finally, to reduce the eddy-currents induced by time-varying stray fields, a group of radial slots, such as slots 54A–57A (FIG. 14A) are disposed in the mover laminations. Total core losses therefore are very small compared to copper losses.

Considering now the sets 40A–43A of permanent magnets in greater detail, the sets 40A–43A are substantially identical so only set 40A will be described hereinafter in greater detail. It should be noted however, that the polarity of the sets relative to opposing stator poles P, such as the polarity of magnet sets 40A and 41A respectively is reversed in order to induce a flow of magnetic flux in planes normal to the axis of relative motion between the stator assembly 14A and the mover assembly 16A.

Considering now the set 40A in greater detail with reference to FIGS. 1A and 3A, the set 40A generally includes four permanent magnets 45A–48A respectively. Each of the permanent magnets, such as permanent magnet 45A is arcuate in cross section and uniform in its cross-sectional thickness ($h_M$) throughout its entire axial length of about $l_s$ millimeters. A suitable permanent magnet is a Hitachi HI COREX-97 with radial magnetization.

Figure 10A:
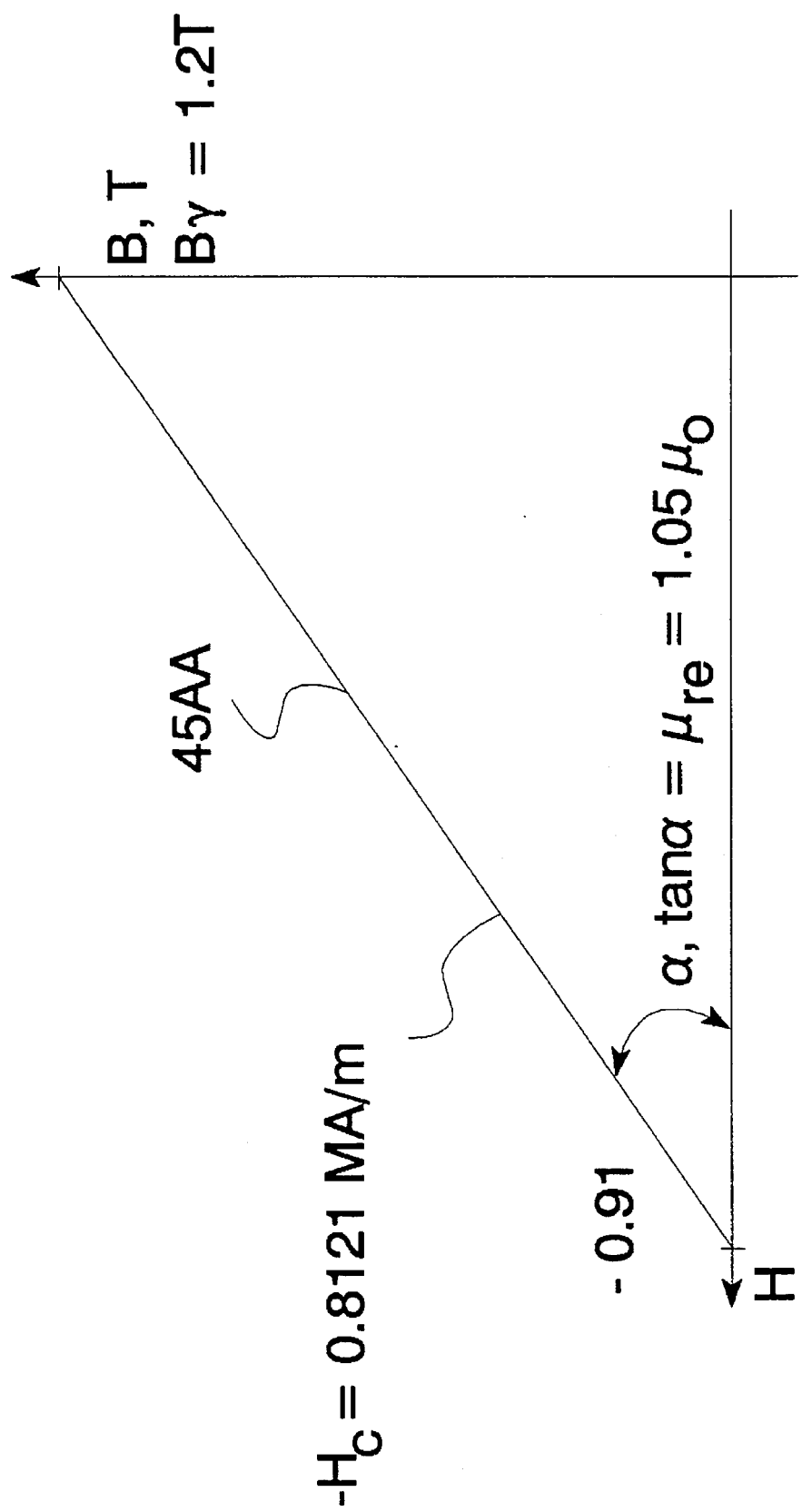
FIG. 10A is a graphic representation of a permanent magnet demagnetization curve regarding the machine of FIG. 1A;.

Referring now to FIG. 10A the demagnetization characteristic 45AA of one of the magnets, such as the magnet 45A is illustrated. The demagnetization characteristic shows a flux density (B) relative to a magnetizing force (H) relationship. From FIG. 10A the following is illustrated:

remnant flux density, $B_\gamma = 1.2$ T coercive force, $H_c = -0.8121$ MA/m recoil permeability, $\mu_{re} = 1.05 \mu_0$.

The flux-density distribution of each permanent magnet, such as the permanent magnet 45A is three-dimensional. However, this may be solved as two two-dimensional problems, utilizing radial and axial symmetries. For illustration purposes, only the field distribution in a two-dimensional axial cross-section is needed. As may be seen from FIGS. 9AA and 9BA, the maximum flux position reveals both the maximum flux $\phi_{max}$ in stator poles 1A and 3A, and minimum flux $\phi_{min}$, in stator poles 2A and 4A. For best results, reduce $\phi_{min}$ in must be reduced as much as possible. With airgap magnets (FIG. 3A) this goal is accomplished when:

$$g + h_m \approx \frac{1}{2} l_s \tag{6}$$

where g=airgap, $h_m$=magnet thickness, and $l_s$=stroke length. For example purposes, the slug groups 24A and 26A are separated by the distance $l_s$, where $l_s$ is assumed to be about 10 mm, $h_R$ about 3 mm, and g about 0.3 mm. Thus, ½$l_s$=5 mm.

The magnetic permeance, $G_4$ (FIG. 11AA) is zero; and for all practical purposes, only $G_3$ remains for the first mover slug group 24 and 2$G_3$ for the second mover slug group 26A. However, $G_3$ on the left side of mover slug group 24A cancels on $G_3$ for the $\phi_{min}$. Finally, $G_{2n}$ cancels $G_5(0)$. Thus, for the difference ($\phi_{max} - \phi_{min}$) only $G_{g1}(0)$ counts for $\phi_{max}$ and $G_3$ for $\phi_{min}$.

Proceeding with the magnetic field distributions, the permanent magnet is replaced by its equivalent mmf ($I_{PM}$) such that:

$$I_{PM} = \frac{B_\gamma h_m}{\mu_{re}} \tag{7}$$

Substituting numerical values $B_\gamma = 1.2$ T, $h_m = 3$ mm, and $\mu_{re} = 1.05 \mu_0$ in equation (7) yields:

$$I_{PM} = \frac{1.2 \times 3 \times 10^{-3}}{1.05 \times 4\pi \times 10^{-7}} = 2728.37 A \tag{8}$$

Figure 11A:
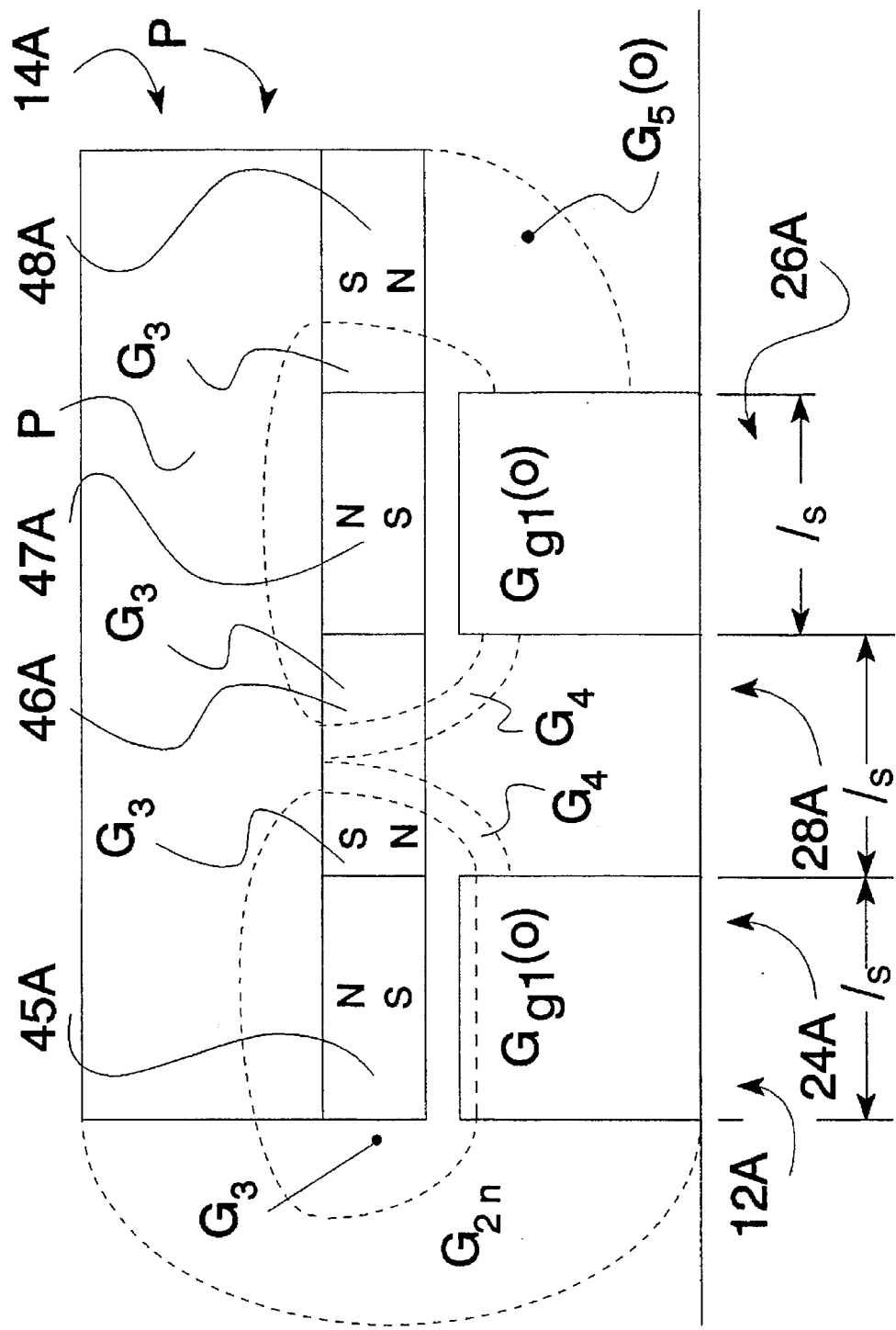
FIG. 11AA is a diagrammatic representation of permeances for a mover positioned at an end of stroke position for the machine of FIG. 1A.
Figure 11B:
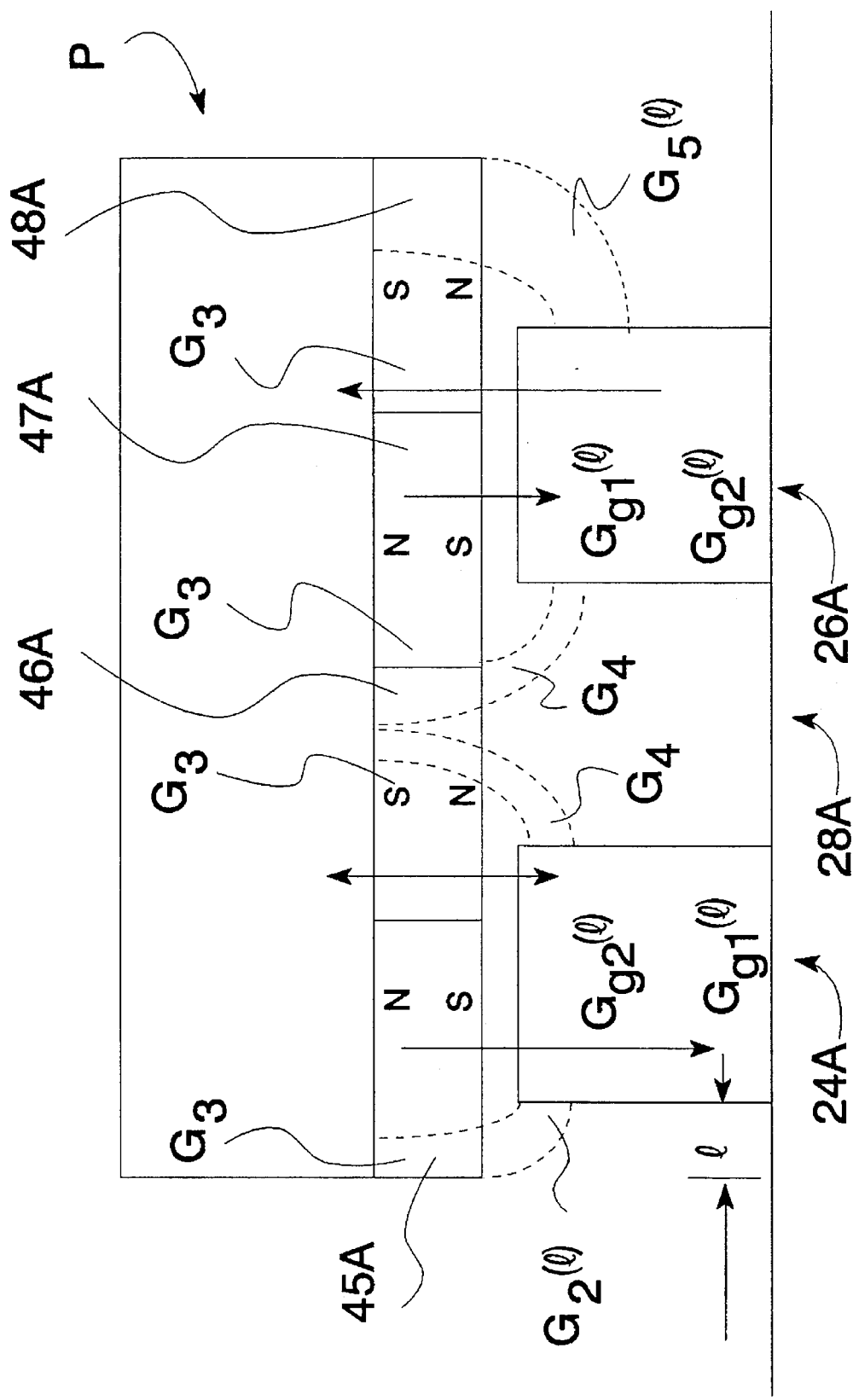
FIG. 11BA is a diagrammatic representation of permeances for a mover positioned at other than an end of stroke position of the machine of FIG. 1A.

This mmf is at the airgap and contemplates the permeances $G_{g1}(0)$ and $G_3$ (FIG. 11AA). Therefore, the maximum and minimum fluxes are given by:

$$\phi_{max} = G_{g1}(0) I_{PM} \tag{9}$$

and $$\phi_{min} = G_3 I_{PM} \tag{10}$$

where the permeances are given by:

$$G_{g1}(0) = \mu_0 \pi \left[ D_{re} + \frac{1}{2}(g + h_m) \right] \left( \frac{l_s}{g + h_m} \right) \frac{\alpha_p}{360} \tag{11}$$

and $$G_3 = 3.3 \, \mu_o \left[ \frac{1}{2} D_{re} + \frac{1}{2} (g + h_m) \right] \frac{\alpha_p}{360} \quad (12)$$

In equations (11) and (12) $\alpha_p$ equals the angle subtended by the pole arc (in degrees) at the axis and other symbols have been defined earlier. In this design example, $\alpha_p = 47°$. Substituting other numerical values in equations (11) and (12) yields:

$$G_{g1}(0) = 4\pi 10^{-7} \pi \left[ 50.0 + \frac{1}{2} \times 3.4 \right] 10^{-3} \times \quad (13)$$

$$\frac{10}{3.4} \times \frac{47}{360} = 0.0784 \times 10^{-6} H$$

$$G_3 = 3.3 \times 4\pi \times 10^{-7} \left[ \frac{1}{2} \times 50 + \frac{1}{2} \times 3.4 \right] 10^{-3} \times \quad (14)$$

$$\frac{47}{360} = 0.0144 \times 10^{-6} H$$

Finally, from equations (8), (9), (10), (13) and (14) the difference between the maximum flux density $\phi_{max}$ and minimum $\phi_{min}$ is obtained:

$$\phi_{max} - \phi_{min} = I_{PM}[G_{g1}(0) - G_3] \quad (15)$$

(and)

$$\phi_{max} - \phi_{min} = 2728.37(0.0784 - 0.0144)10^{-6} = 0.175 \, mW_b \quad (16)$$

Consideration saturation, with a saturation factor of 1.17, equation (16) yields:

$$(\phi_{max} - \phi_{min})_{sat} = \frac{0.175 \times 10^{-3}}{1.17} = 0.1496 \, mW_b \text{(per coil)} \quad (17)$$

The flux density in the pole core is given by:

$$B_{pb} = \frac{\phi_{max}}{l_s b_{pb}} = \frac{2728.37 \times 0.0784 \times 10^{-6}}{0.01 \times 0.021} \approx 1.0 \, T \quad (18)$$

where $b_{pb}$ equals is the width of the pole P.

Considering now the induced voltage and the resulting electromagnetic power in greater detail. The induced voltage is given by equation (5). Thus, at a 60 Hz input (under saturated condition):

$$E_a = 35.538 \times 60 \times 0.1496 \times 10^{-3} N_c = 0.319 N_c \quad (19)$$

where $N_c$ = turns/coil (is to be determined).

The maximum electromagnetic power is produced when the induced emf $E_a$ and the armature (or coil) current $I_a$ are in phase; that is, $$(P_{em})_{max} = E_a I_a \quad (20)$$

With $(P_{em})_{max} = 240 \, W$, combining equation (19) and (20) yields:

$$240 = 0.319 N_c I_a \quad (21)$$

or, $$N_c I_a = \frac{240}{0.319} = 752.3 \, At$$

Referring now to FIG. 1A, it can be seen that the magnets 45A–48A respectively are mounted at the air gap g in an abutting manner with alternating magnetic poles, such as N, S, N, S poles respectively. In order to substantially prevent flux leakage between poles, the stator assembly includes a set of annular shaped insulators or spacers 34A–36A respectively. From the foregoing, it will be understood by those skilled in the art, that the stator units 30A–33A and the associated insulators 34A–36A define a plurality of elongated pole sets where adjacent poles of each pole set have alternating magnetic polarity.

Figure 19A:
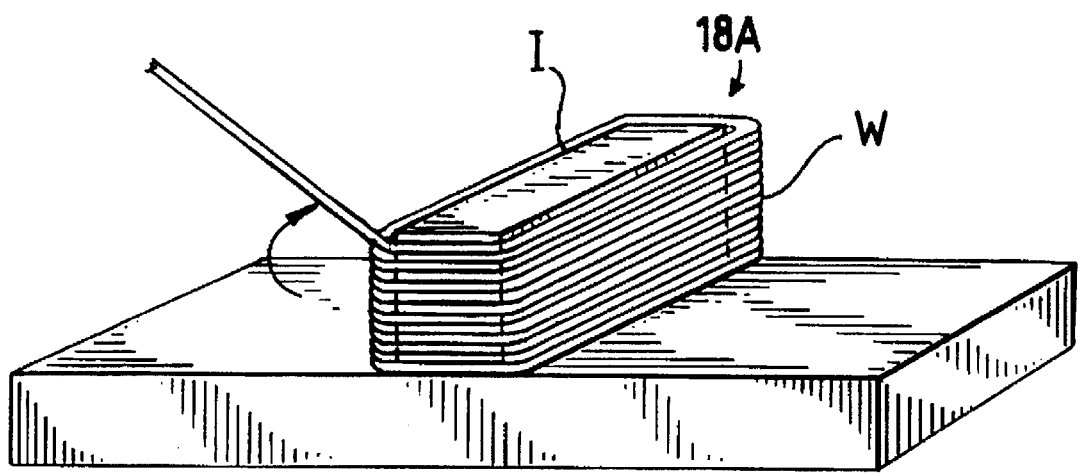
FIG. 19A is a diagrammatic representation of a spool for helping to form the coil of FIG. 16A.

Considering now the construction of the machine 10A in greater detail, for ease in construction and assembly, each of the stator windings, such as a winding W is formed on a spool, such as a spool 18A (FIG. 19A) by a conventional winding technique. In this regard, the spool 18A is first wrapped with an insulation material I and then the insulation is wrapped with copper wire to form the winding W. Once assembled, the stator winding W is removed from the spool to form a generally rectangular annular shaped winding configuration with a centrally disposed hole WH (FIG. 16A). The winding W is suitably dimensioned to fit over and surround its stator pole P.

In assembling the winding onto its associated pole P, such as the winding 51A on its pole P, the winding 51 is received in the center of the space 13A and brought into radial alignment with its associated pair of winding slots, such as slots S1 and S2 as best seen in phantom lines in FIG. 2A. The winding 51A is,then moved radially outwardly away from the center of the space 13A toward the pole P. In this regard, the winding 51A is received onto pole P. The winding is secured to the pole P by any conventional technique, such as applying suitable epoxy.

From the foregoing, those skilled in the art will understand each stator winding is mounted onto its associated stator pole in a similar manner.

When all of the windings 50A–53A have been mounted onto their associated stator poles P, the windings 50A–53A are connected in series as best seen in FIG. 18A having a pair of free conductors. 54A and 56A respectively. The free end conductors 54A and 56A windings 50A and 53A respectively are then connected to a power source $V_s$ (not shown) to energize electrically the windings to create electromagnetic power. Thus, assembly of the individual windings land their mounting on associated stator poles is accomplished in a fast convenient manner.

Considering now the mover assembly 12A in greater detail, the slug groups 24A and 26A are substantially identical so only slug groups 24A will now be described hereinafter in greater detail.

Referring now to FIGS. 1A and 3A, the slug group 24A generally includes a group of electrical steel laminations, such as laminations 60A–65A. As each of the lamination 60A–65A are substantially identical, only lamination 60A will be described.

As best seen in FIG. 14A, lamination 60A is generally annular in shape having a plurality of equally spaced apart substantially semi-circular cut-out portions 70A–73A respectively for helping to define a plurality of mover poles 76A–79A respectively.

The irregularly shaped openings or slots 54A–57A respectively are disposed in corresponding ones of the mover poles 76A–79A respectively. The slots 54A–57A help to reduce eddy currents in each respective mover pole. The lamination 60A may be manufactured in a manner similar to the laminations found in rotary machine, such as by stamping the lamination from a sheet of electrical steel having a desired thickness, such as a 0.5 millimeter thickness. A suitable material is M-5 grain oriented electrical steel or the like. As each of the mover poles 76A–79A are substantial identical only mover pole 79A will be described hereafter in greater detail.

Referring now to FIG. 2A, the mover pole 79A has an arcuate surface indicated generally at 68A which defines the outer diameter ($D_{re}$) of the mover assembly 12A. In this regard, the outer diameter ($D_{re}$) of the mover assembly 12A in one preferred form of the present invention is approximately one-half of the outer diameter ($D_{re}$) of the stator assembly 14A. The arcuate surface 68A of the mover pole 79A is spaced apart from the stator pole P to define the magnetic air gap (g).

Considering now the current density of the machine 10A, for the 192 $mm_2$ available window area ($A_w$) and a fill factor $K_{fill}=0.6$ we have:

$$A_{coil}=K_{fill}A_w=0.6\times192=115.2 \text{ mm}^2 \quad (22)$$

From equations (21) and (22) the coil current density is given by:

$$J_c=\frac{N_cI_a}{A_{coil}}=\frac{752.3}{115.2}=6.53 A/mm^2 \quad (23)$$

Considering now the machine 10A parameters and its equivalent current, the machine resistance $R_s$, with four coils in series is given by:

$$R_s=\frac{4N_cl_c\rho_c}{A_{coil}}=\frac{4\rho_cl_cN_c^2J_c}{N_cI_a} \quad (24)$$

where $l_c$=mean length/turn≈2(21+16+40+16)=0.186 m and $\rho_c=2.1\times10^{-8}\delta/m$=resistivity of copper. Thus, equation (24) yields:

$$R_s=\frac{4\times2.1\times10^{-8}\times0.186\times6.53\times10^{-6}}{752.3} \quad N_c^2=1.356\times10^{-4}N_c^2 \quad (25)$$

The coil losses are given by:

$$P_c=I_a^2R_s=1.356\times10^{-4}(N_cI_a)^2=1.356\times10^{-4}(752.3)^2=76.7 \text{ W} \quad (26)$$

In order to determine the reactance, it is assumed that the stator reactance does not vary with the mover position, since the air gap/iron interface does not vary with the mover position. Now the permanence see by each coil, $G_{coil}$, for the main flux path is $$G_{coil}=2[G_{g1}(0)+G_3]=2[0.0784+0.0144]10^{-6}=0.186\times10^{-6}\text{henr} \quad (27)$$

Consequently, the total main path inductance, $L_m$ for four coils in series becomes:

$$L_m=4G_{coil}N_c^2=4\times0.186\times10^{-6}N_c^2=7.44\times10^{-7}N_c^2 \quad (28)$$

The leakage inductance has two components. These are slot-leakage and end-connection leakage inductances. Accounting for these components, the leakage inductance is given by:

$$L_{sc}=8N_c^2(\lambda_sl_{cs}+\lambda_el_{ce}) \quad (29)$$

where $l_{cs}$=coil length in the slot=$4l_s$=40 mm; $l_{ce}$=end-connection coil length per side=½($l_c-2l_{cs}$)=½ 186–2×40= 53 mm; $\lambda_s$=slot specific permeance as given by:

$$\lambda_s=\mu_0\left[h_1/\frac{1}{2}(b_c+b_{c1})+h_2/\frac{1}{2}(b_{c1}+b_{c2})\right]= \quad (30)$$

$$\frac{1}{3}\mu_0\left[9/\frac{1}{2}(12+15)+7/\frac{1}{2}(15+20)\right]=0.355\mu_0$$

The end-connection specific permeance may be taken $\lambda_e$=½$\lambda_s$, since the end connections are in air. Thus, equation (29) yields:

$$L_{sc}=8N_c^24\pi10^{-7}\times0.355\left(0.04+\frac{1}{2}\times0.053\right)=2.375\times10^{-7}N_c^2 \quad (31)$$

Combining (26) and (29) the total stator inductance is derived as:

$$L_s=L_m+L_{sc}=(7.44+2.375)10^{-7}N_c^2=9.815\times10^{-7}N_c^2 \quad (32)$$

The electrical time constant of the coil is:

$$\tau_e=\frac{L_s}{R_s}=\frac{9.815\times10^{-7}N_c^2}{1.356\times10^{-4}N_c^2}=7.24ms \quad (33)$$

Figure 12A:
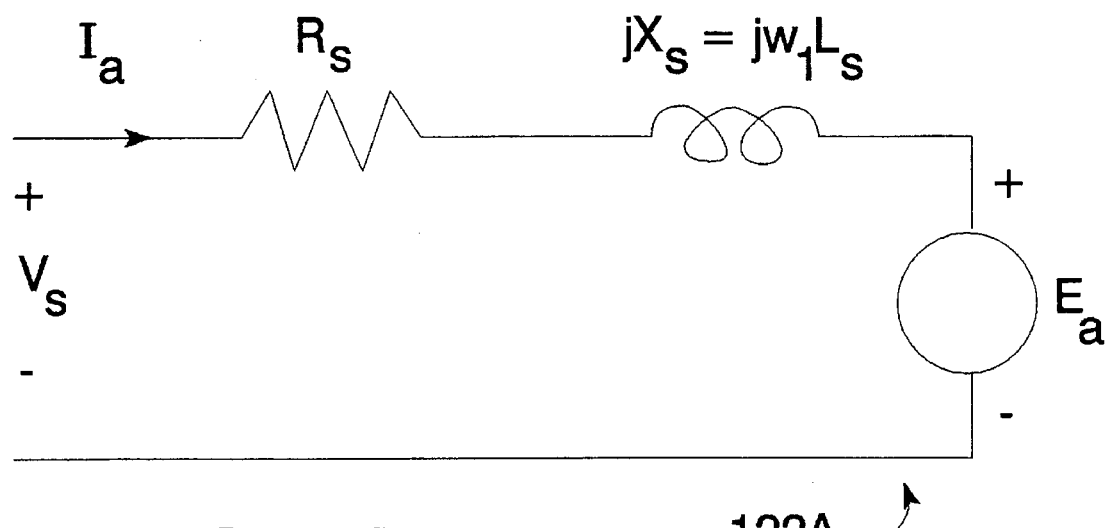
FIG. 12A is an equivalent circuit diagram for the electrodynamic machine of FIG. 1A.

And, thus the machine 10A may be represented by an equivalent circuit 122A as shown in FIG. 12A.

Figure 13A:
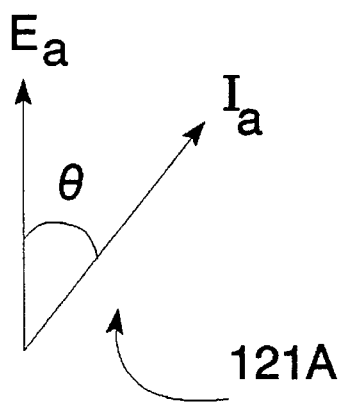
FIGS. 13AA–13BA are phasor diagrams for the equivalent circuit of FIG. 12A.
Figure 13B:
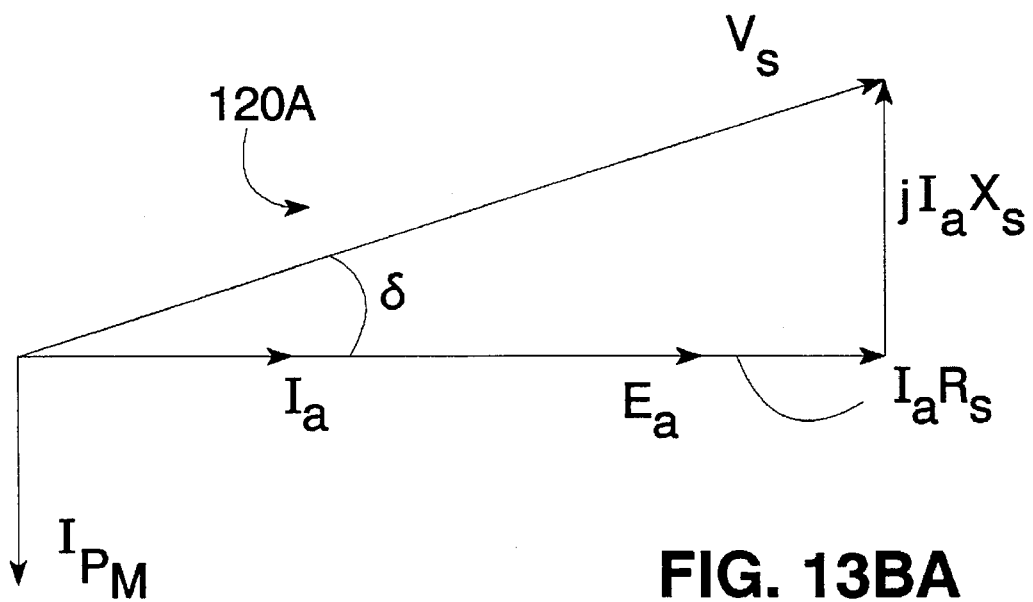

Considering the number of turns per coil in greater detail, for maximum power, the angle θ (FIG. 13AA) must be zero. Consequently, for this condition a phase diagram 120A as shown in FIG. 13BA, is developed when θ equals zero degrees, where θ as shown in phase diagrams 121A is the phase angle between $E_a$ and $I_a$. From the foregoing:

$$V_s^2=(E_a+I_aR_a)^2+(l_cw_1L_sI_a)^2 \quad (34)$$

Substituting numerical values in (34) yields:

$$110^2=(0.319 N_c+I_a1.386\times10^{-4}N_c^2)^2+(377\times9.815\times10^{-7}N_c^2I_a)^2 \quad (35)$$

Since $N_c^2I_a=(N_cI_a)N_c=752.3 N_c$ this quantity may be substituted into equation (35). Substituting and solving for $N_c$ yields $N_c$=218 turns/coil.

Since $N_cI_a$=752.3 and $N_c$=218, the coil or armature current $I_a$=752.3/218=3.45 lamps.

Considering now wire size for the coils, such as the coil 50; with $I_a$=3.451 A as calculated above and $J_c$=6.53 A/mm² from equation (23), the conductor diameter becomes:

$$d_c=\sqrt{\frac{4I_a}{\pi J_c}}=\sqrt{\frac{4\times3.451}{\pi\times6.53}}=0.82mm \quad (36)$$

Thus, for the illustrated example a AWG20 wire size is preferred for which $d_c$=0.032 in or 0.813 mm diameter.

Considering now the resistance ($R_s$) and inductance ($L_s$) parameters of FIG. 12A, with $N_c$=218 and $d_c$=0.82 mm (or 0.032 in) the following parameter values are derived:

From equation (23), $R_s=1.356\times10^{-4}\times218^2$=6.44ohms (37)

From equation (30), $L_s=9.815\times10^{-7}\times218^2$=0.0466 henrys (38)

and $X_s=l_cw_1L_s$=377×0.0466=17.58 ohms (39)

Finally, from equation (19)

$E_a$=0.319×218=69.5 volts (40)

When the machine 10A is a operated as a motor, there is no need for a tuning capacitor. However, those skilled in the are will understand that if such a tuning capacitor is utilized, its value should be about 150 μF for each coil having 260 turns (not 218 turns as determined earlier).

Referring now to FIG. 12A, the line starting of the machine 10A is devised. In this regard, the maximum starting current is given by:

$$(I_a)_{stg}=\frac{\sqrt{2} V_s}{\sqrt{R_s^2+X_s^2}}=\frac{110\sqrt{2}}{\sqrt{6.44^2+17.58^2}}=8.3amps \quad (41)$$

Because the machine 10A must synchronize within one-fourth of a period (or≅4 ms), the chosen wire can withstand this current for that duration. However, of greater concern is the probability of demagnetization of the magnets. So, the mmf at starting is:

$$N_c(I_a)_{stg}=218 \times 8.3=1809.4 \text{ At} \qquad (42)$$

For the magnet, from equation (8) $I_{PM}$, is determined:

$$I_{PM}=2728.37 \text{ amps} \qquad (43)$$

Comparing (42) and (43) it is concluded that the magnets will not be demagnetized during starting, and the motor may be line-started.

Considering now the performance of the machine 10A in greater detail, from equation (26) the copper losses $P_c$, are equal to about 76.7 W. The mover mass $M_m$ (not including the rod) is given by equation (44) as follows:

$$M_m \simeq 2 \times \frac{\pi}{4} D_{re}^2 l_s (0.8) \rho_{iron} \qquad (44)$$

$$M_m = \frac{2\pi}{4} (50 \times 10^{-3})^2 10 \times 10^{-3} \times 0.8 \times 7900 = 0.248 \text{kg or } 248 \text{gm}$$

Loss density in good quality electrical steel is about 2 W/kg at 60 Hz and 1.0 T flux density. Therefore, the total core losses are estimated not to exceed 6 W. Thus, at rated, load, $$\text{Total Losses, } P_{loss} = 76.7 + 6 = 82.7 \simeq 83W \qquad (45)$$

$$\text{Electrical Efficiency, } \eta = \frac{240}{240+83} = 74.3\% \qquad (46)$$

$$\text{Power Factor, } \cos\phi = \frac{240+83}{110 \times 3.451} = 0.85 \qquad (47)$$

$$\text{Approximate Weight of Copper, } M_c \simeq l_{co} \frac{\pi d_e^2}{4} \rho_{cm} = \qquad (48)$$

$$\pi \frac{(0.82)^2}{4} \times 8900 l_{co} \times 10^{-6}$$

where $l_{co}$=total copper length=$4N_c l_c$=4×218×0.816=162.2 m. Substituting this value in (48) yields the mover copper mass $M_c$.

$$M_c = \frac{\pi}{4} \times 0.82^2 \times 10^{-6} \times 8900 \times 162.2 = 0.76 \text{kg} \qquad (49)$$

The above constitutes a satisfactory performance. It should be noted, however, that the performance could be improved if the spaced (or envelope) constraints were different than those shown for this example. Secondly, the greatest advantage of the configuration described herein is the ease of assembly and manufacture, and repair.

Table I summarizes the performance data for the example machine described herein.

TABLE I

| | |
|---|---|
| Output power, W | 240 |
| Copper losses, W | 77 |
| Weight of copper, kg | 0.817 |
| Core losses, W | 6 |
| Mover core weight, kg | 0.25 |
| Estimated total mover weight, kg | 0.55 |
| Magnet volume, mm³ | 10 |
| Wire size, AWG | 20 |
| Tuning capacitor, µf | NONE |
| Maximum rated current density, A/mm² | 6.55 |
| Wire size, AWG | 20 |
| Rated efficiency, per cent | 74.3 |
| Rated power factor | 0.85 |
| Rated current, A | 3.45 |
| Fabrication costs (relative) | LOW |
| Coil repair costs (relative) | VERY LOW |

TABLE I-continued

Considering now the stator assembly 14A in still greater detail with reference to FIGS. 1A–3A, the stator assembly includes a stator core indicated generally at 15A which includes a plurality of about eighty laminations L. The laminations L are each about 0.5 millimeters in thickness and are stacked in abutting relationship between the pair of stator end plates, 15AA and 17AA. For clarity purposes the end plates are, not illustrated in FIG. 1A. The end plates 15AA and 17AA are each about 2 millimeters in thickness. As each of the lamination L are substantially identical, only one of the laminations will be described in greater detail.

Figure 15A:
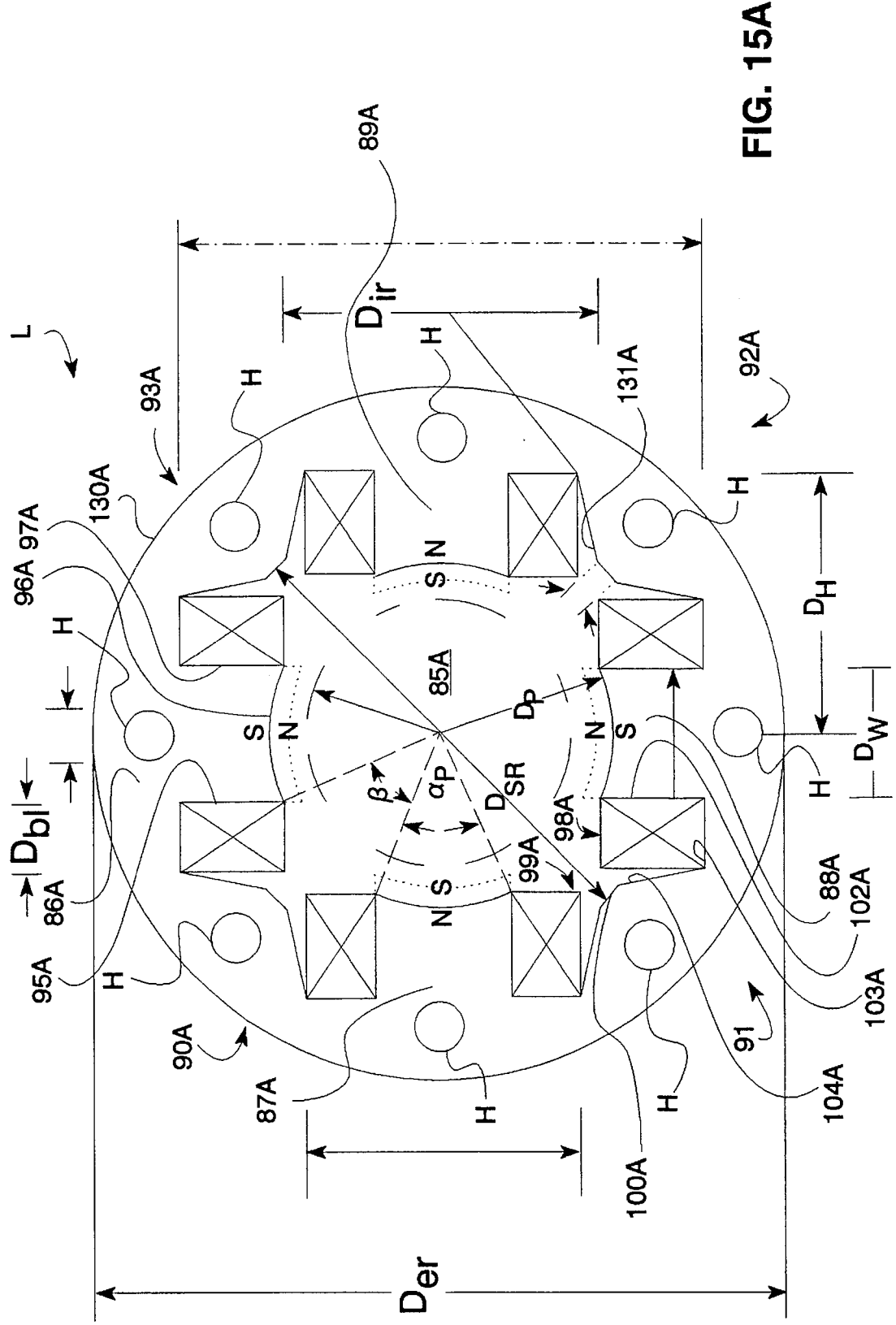
FIG. 15A is an axial cross sectional view of the mover of FIG. 1A taken substantially on lines 14A—14A thereof.

As best seen in FIG. 15A, the lamination L is annular in shape having a centrally disposed irregularly shaped cut out portion 85A. The cut out portion 85A is configured to help define a portion of each of the stator poles P and the stator slots when the laminations L are stacked to form the stator core 15A.

An outside peripheral wall or surface 130A of the lamination L is generally smooth so that when the lamination L is stacked together with other laminations between the end plates 15AA and 17AA, the laminations form a smooth hollow cylinder with the interior space 13A therewithin.

A total of eight axial holes H are equally spaced apart at about a distance $D_H$ from the geometric the lamination L. Each hole H is about 5.0 millimeters in diameter and is adapted for receiving therein one of the stator bolts, such as the bolt B1. The outside diameter $D_{er}$ of the lamination L is about 102 millimeters. The inside diameter $D_{ir}$ of the lamination L is about 90.8 millimeters.

As best seen in FIG. 15A, an interior surface or wall 131A of the lamination L is irregularly shaped define a set of four converging pole segments 86A–89A which are equally spaced apart from one another around the interior of the lamination at about a distance $D_p$ from its geometric center. A corresponding set of four diverging cut out sections or portions 90A–93A are disposed between adjacent pairs of the pole segments, such as the cut out portion 90A disposed between pole segments 86A and 87A respectively.

Each cut out section, such as the cut out section 90A, helps define a portion of one of the coil receiving slots. The arcuate angle between such pole segments, such as pole segments 86A and 87A, is about 43 degrees. As each of the pole segments 86A–89A are substantially identical only pole segment 86A will be described in greater detail.

Considering not the pole segment 86A in greater detail with reference to FIG. 15A, pole segment 86A is uniform in cross section dimension and has a generally rectangular shape. The pole segment 86A includes a pair of substantially straight spaced apart side wall portions 95A and 97A respectively. A top wall portion 96A having an arcuate-surface is disposed between side wall portions 95A and 97A to integrally connect them. The top wall portion 96A is disposed at about the distance $D_p$ from the geometric center of the lamination L, where the distance $D_p$ is about 56.8 millimeters. The sidewalls 95A and 97A are separated by about a distance $D_w$, where the distance. $D_w$ is about 21 millimeters. The arcuate angle between the side walls 95A and 97A is about 47 degrees. The arcuate angle β between adjacent pole walls is about 43 degrees.

As each of the cut out sections 90A–93A are substantially identical only cut out section 91A will be described in greater detail.

Considering now cut out section 91A in greater detail with reference to FIG. 15A, the cut out section 90A is defined by an irregularly shaped right hand portion 98A and an irregularly shaped left hand portion 99A which are spaced apart from one another by a straight edge portion 100A. The straight edge portion 100A is disposed at about a distance $D_{se}$ from the geometric center of the lamination L, where the distance $D_{se}$ is about 75 millimeters. The straight edge portion 100A has a width of about 2 millimeters and is in radial alignment with an associated one of the axial holes H.

Considering now the right hand portion 98A and the left hand portion 99A in greater detail, the potions 98A and 99A are complementarily shaped so only portion 98A will be described in greater detail.

Considering, now the right hand portion 98A in greater detail with reference to FIG. 15A, the right hand portion 98A includes a straight leg portion 102A that defines a sidewall peripheral edge of the pole segment 88A. A base leg portion 103A extends away from the portion 102A at about 90A degrees. The base leg portion 102A terminates at about a distance $D_{bl}$ from the side edge portion 102A, where the distance $D_{bl}$ is about 12.5 millimeters. The right hand portion 98A also includes a ramp leg portion 104A that extends between the respective right and left terminal ends of straight edge portion 100A and base leg portion 102A respectively.

Referring now to the drawings, and more particularly to FIGS. 4A–6A there is shown a linear electrodynamic machine 200A which is constructed in accordance with the present invention.

The electrodynamic machine 200A generally comprises an elongated cylindrically shaped mover assembly 212A and an elongated cylindrically shaped stator assembly 214A which are arranged and constructed for reciprocating axial movement relative to one another.

The mover assembly 212A and the stator assembly 214A coact dynamically with one another for converting electrical energy to mechanical energy. In this regard, the stator assembly 214A is connected electrically to a source of electrical power (not shown) while the mover. assembly 212A is connected to a rod 216A for transferring the mechanical energy produced by the machine 200A to a given apparatus (not shown).

Considering now the mover assembly 212A in greater detail with reference to FIGS. 4A–6A, the mover assembly 212A includes three spaced apart annular shaped slug or lamination groups, indicated generally at 224A–226A respectively. A pair of light weight spacers 227A and 228A respectively are interleaved with the slug groups 224A, 225A and 226A in order to separate the slug groups by a predetermined distance $l_s$. The slug groups 224A–226A and spacers 227A–228A are mounted on the rod 216A between a pair of nonconductive end plates or collars 229A and 229AA respectively. In this regard, the collars 229A and 229AA in cooperation with a set of mounting bolts 219A and 220A help secure the slug groups 224A–226A and spacers 227A–228A in a stationary position on the rod 216A. For clarity purposes, not all of the mover mounting bolts are not shown in FIGS. 4A and 5A. The collars 229A and 229AA and spacers 227A–228A are substantially similar to collars 29A and 29AA and spacer 28A and will not be described in greater detail.

Considering now the stator assembly 214A in greater detail with reference to FIGS. 4A–6A, the stator assembly 214A generally includes a set of spaced part stacked stator units or groups indicated generally at 230A–235A respectively. The stator units 230A–235A are interleaved with a corresponding set of non-magnetic non-conductive spacers or insulators 236A–240A respectively. A pair of non-magnetic non-conductive end plates or collar units 221A and 222A (FIG. 6A) in cooperation with a set of mounting bolts, such as bolts B, help secure the stator units 230A–235A and insulators 236A–240A together. For clarity purposes the end plates 221A and 222A and certain ones of the stator mounting bolts are not shown in FIG. 4A and 5A.

Each stator unit, such as stator unit 230A, include a plurality of annular laminations, such as a lamination $L_1$ for helping to define a portion of a plurality of space apart axially extending stator poles P1–P4 respectively, and axial extending coil receiving slots, S1–S4 respectively. In order to help accommodate a large quantity of copper within each coil receiving slot, each respective slot S1–S4 include respective sets of inner slot areas and outer slot areas as shown in Table II.

TABLE II

| Slot No. | Inner Areas | Outer Areas |
|---|---|---|
| S1 | 274A, 275A | 304A, 305A |
| S2 | 276A, 277A | 306A, 307A |
| S3 | 278A, 279A | 308A, 309A |
| S4 | 280A, 281A | 310A, 311A |

For the purposes of inducing a flow of magnetic flux in each of the stator poles P1–P4 respectively, the stator assembly 214A also includes four set 241A–244A of permanent magnets. The sets 241A–244A of permanent magnets are mounted at their respective stator poles P1–P4 respectively in an airgap $g_1$ disposed between the mover assembly 212A and the stator assembly 214A.

In order to cause electrodynamic interaction between the mover assembly 212A and the stator assembly 214A, the stator assembly 214A also includes four sets 250A–253A of stator coils or windings that are mounted on the respective stator poles P1–P4. In this regard, the respective sets 250A–253A of stator windings are disposed within corresponding pairs of the coil receiving slots as illustrated in Table III.

TABLE III

| Pole No. | Winding Set | Coil Receiving Slot |
|---|---|---|
| P1 | 250A | S1 and S4 |
| P2 | 251A | S1 and S2 |
| P3 | 252A | S2 and S3 |
| P4 | 253A | S3 and S4 |

As the sets 250A–253A of stator windings are substantially identical only set 250A will be described hereinafter in greater detail.

Considering now set 250A stator winding in greater detail, set 250A includes a small inner stator winding 258A and a large outer stator winding 259A that are connected electrically in series together. The inner stator winding 258A is mounted in inner stator slot areas 274A and 281A, while outer stator winding 259A is mounted in outer stator slot area 304A and 311A. Both the inner stator winding 258A and the outer stator winding 259A are generally rectangular in shape and are mounted in an abutting relationship to form a stair step type configuration. Both winding 258A and 259A have centrally disposed openings which corresponding substantially to the width of an individual one of the stator poles.

Considering now magnet sets 241A–244A in greater detail, as sets 241A–244A are substantially identical, only magnet set 241A will be considered.

As best seen in FIGS. 4A. and 6A, magnet set 241A is mounted at the air gap $g_1$ on stator pole P1 and generally includes six permanent magnets 283A–288A. The magnets 283A–288A are mounted with alternating magnetic poles, such as N, S, N, S, N, S poles respectively. The insulators 236A–240A are interleaved with the permanent magnets 28A–288A to help prevent flux leakage between abutting poles. Magnet 283A–288A are substantially similar to magnets 46A–48A and will not be described in greater detail.

The axial length of the permanent magnet set 240A is about $6l_s$, where $l_s$ is equal to the axial length of each respective one of the slug groups 224A–226A, each respective one of the stator units 230A–235A, and each respective one of the permanent magnets 283A–288A.

From the foregoing it should be understood that with respect to each stator pole, such as stator pole P1, there are six stator sections or units, such as units 231A–235A and a corresponding six permanent magnets, such as permanent magnets 283A–288A. In this regard, there is one permanent magnet for each stator pole section.

Considering now the mover assembly 212A in greater detail, the slug groups 224A–226A are substantially identical so only slug group 224A will be described.

Referring now to FIGS. 4A–6A, the slug group 224A generally includes a group of substantially identical electrical steel laminations, such as laminations 321A–323A. As the laminations 321A–323A are substantially identical, only lamination 321A will be described in greater detail.

Figure 5A:
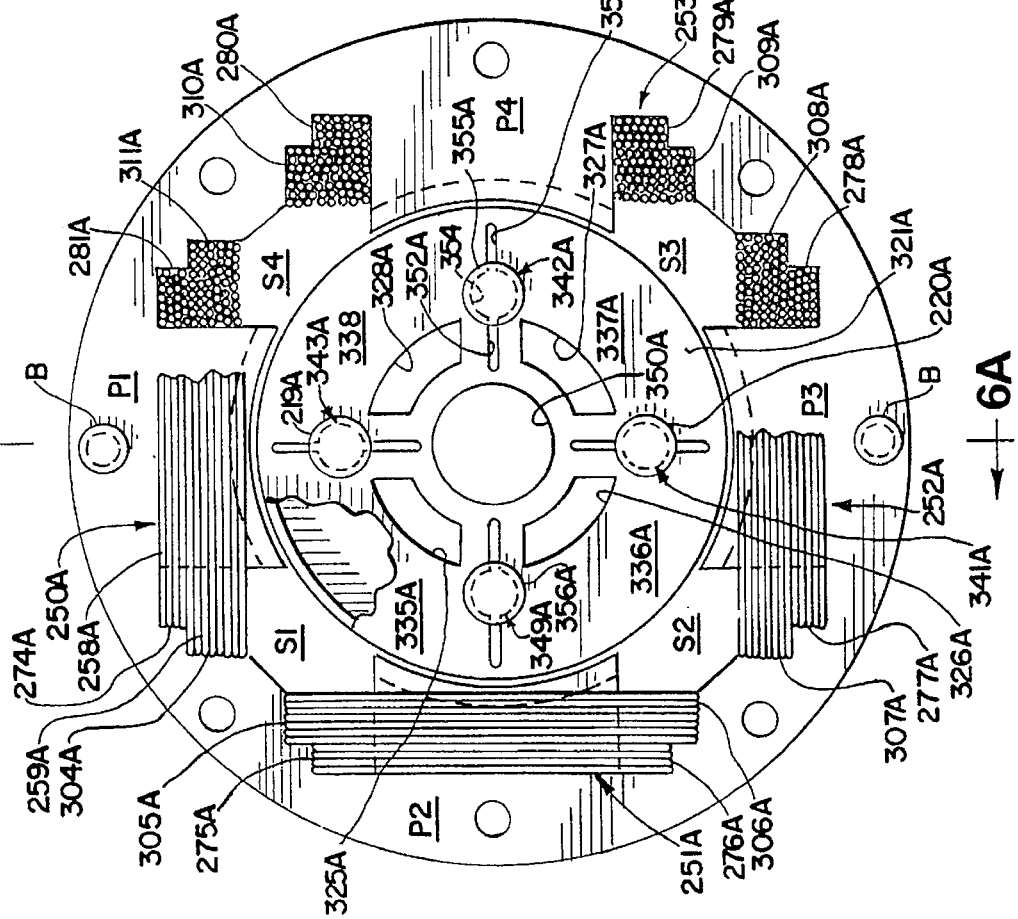
FIG. 5A is a fragmentary face view of the machine of FIG. 4A, illustrating it in an assembled manner.

Considering now lamination 321A in greater detail with reference to FIG. 5A, the laminations 321A is generally annular in shape having a plurality of equally spaced apart cut out portions 325A–328A for helping to define a plurality of mover poles 335A–338A.

A set of irregularly shaped openings or slots are disposed between the mover poles as shown in Table IV for helping to reduce eddy currents in the mover assembly 212A. In this regard, the openings or slots 340A–343A as shown in FIG. 5A, and described in Table IV are disposed equally spaced apart radially inwardly from the outside peripheral boundary of the lamination 321A.

TABLE IV

| Mover Pole Pairs | Slots |
| --- | --- |
| 335A, 336A | 340A |
| 336A, 337A | 341A |
| 337A, 338A | 342A |
| 338A, 335A | 343A |

In order to permit the lamination 321A to be mounted on the rod 216A, the lamination 321A also includes a centrally disposed circular hole 350A.

As each of the slots 340A–343A are substantially identical only slot 342A will be described in greater detail.

Referring now to FIGS. 4A and 5A, slot 342A includes a pair of spaced apart narrow slot member openings 352A and 353A respectively. A generally circular opening 354A is disposed between the slot member opening 352A and 353A. The diameter of the circular opening 354A is dimensioned to received therein a mover assembly mounting bolt, such as a bolt 355A or 356A.

Referring now to the drawing and more particularly to FIGS. 7A–9A thereof, there is shown an electrodynamic machine 700A which is constructed in accordance with the present invention. The electrodynamic machine 700A can be constructed and used in accordance with the method of the present invention.

The electrodynamic machine 700A generally comprises an elongated axially extending generally cylindrically shaped mover assembly 712A having a single slug group 726A disposed between a pair of end plates or collar units 724A and 725A respectively. The slug group 726A and collar units 724A, 725A each have a centrally disposed hole H for enabling the mover assembly 712A to be attached to a rod 716A for transferring mechanical energy produced by the machine 700A to a given apparatus (not shown).

The electrodynamic machine 700A also includes an elongated generally cylindrically shaped hollow stator assembly 714A which is arranged and constructed for reciprocating axial movement relative to the mover assembly 712A. In this regard, the mover assembly 712A is axially reciprocatively mounted within the hollow interior of the stator assembly 714A to enable the mover assembly 712A and the stator assembly 714A to coact dynamically with one another for converting electrical energy to mechanical energy.

Although in the preferred form of the present invention the electrodynamic machine 700A is described as a motor, those skilled in the art will understand the electrodynamic machine 700A may also function as an alternator when the rod 716A is connected to a machine, such as a Stirling machine, for moving the respective mover and stator assemblies 712A, 714A rectilinearly axially relative to one another.

The stator assembly 714A generally includes a plurality of stacked substantially similar annularly shaped electrical steel laminations L. The laminations L are stacked in two groups spaced apart from one another by a non-magnetic annularly shaped spacer 732A. In this regard, as will be explained hereinafter, the nonmagnetic spacer 732A has, a sufficient axial width to substantially prevent flux leakage between the spaced apart lamination groups. The stacked laminations L help define a plurality of spaced apart axial extending stator pole pairs 740A–743A and stator coil receiving slots 750A–753A. The stacked laminations L also help define a plurality of axially extending generally parallelogram shaped pole holes or openings 760A–763A and 770A–773A respectively. Pole holes 760A–763A and 770A–773A are centrally disposed in the stator pole pair 740A–743A.

In order to secure the laminations L and spacer 732A together to form the stator assembly 714A, a set of bolts, such as bolts 734A and 735A respectively extend into and through mounting holes H in each of the laminations as will the spacer 732A. Bolts 734A and 735A and secure in the holes H by a set of nuts 736A and 737A respectively. For clarity the mounting bolts are not shown in FIGS. 7A and 8A.

The stator assembly 714A also includes a set of elongated axially extending generally rectangular shaped stator coils or windings 780A–783A mounted to respective stator poles 740A–743A. In this regard, the stator coils 780A–783A are also disposed within corresponding pairs of the coil receiving slots as illustrated in Table V.

TABLE V

| Stator Pole Pair | Winding | Coil Receiving Slots |
| --- | --- | --- |
| 740A | 780A | 750A, 753A |
| 741A | 781A | 750A, 751A |
| 742A | 782A | 751A, 752A |
| 743A | 783A | 752A, 753A |

In order to induce magnetic flux within each stator pole pair, such as stator pole pair 740A, a plurality of permanent magnets 790A–797A are mounted in pairs relative to the stator pole pairs as illustrated in Table VI.

TABLE VI

| Stator Pole Pairs | Permanent Magnet Pairs |
| --- | --- |
| 740A | 790A, 791A |
| 741A | 792A, 793A |
| 742A | 794A, 795A |
| 743A | 796A, 797A |

The permanent magnet pairs also show in Table VI are mounting inside the magnet receiving pole holes associated with each stator pair as illustrated in Table VII.

TABLE VII

| Stator Pole Pair | Magnet Receiving Holes | Permanent Magnet |
| --- | --- | --- |
| 740A | 760A | 790A |
|  | 770A | 791A |
| 741A | 761A | 792A |
|  | 771A | 793A |
| 742A | 762A | 794A |
|  | 772A | 795A |
| 743A | 763A | 796A |
|  | 773A | 797A |

As each of the stator pole pairs 740A–743A are substantially similar only stator pole pair 740A will be described hereinafter in greater detail.

Considering now stator pole pair 740A in greater detail with reference to FIGS. 7A and 9A, the spacer 732A separates the stator pole pair 740A into two spaced apart substantially similar stator pole sections 730A and 731A respectively. As the stator pole sections 730A and 731A are substantially similar, only stator pole section 730A will be described hereinafter.

As best seen in FIGS. 7A–9A, the stator pole section 730A extends radially inwardly from the outside peripheral boundary of the stator assembly 714A terminating in an arcuate shaped inner pole surface indicated generally at 745A. The stator pole section 730A is uniform in cross sectional thickness and includes a pair of spaced apart parallel side walls 798A and 799A respectively separated by the pole surface 745A. The stator pole section 730A is spaced apart from the mover assembly 712A by an airgap distance $g_2$.

The permanent magnet receiving pole hole 760A is disposed within pole section 730A and extends throughout its entire axial length. As best seen in FIG. 8A, the permanent magnet 790A is mounted slantly relative to an imaginary transverse line E bisecting the machine 700A as seen in FIG. 8A in order to increase the total amount of available magnetic flux within the stator pole section 730A.

Considering now the coil receiving slots 750A–753A in greater detail, as slots 750A–753A are substantially similarly only slot 751A will be described in greater detail.

Referring now to FIG 8A, the slot 51A is disposed between pairs of stator pole pairs, 741A and 742A respectively for receiving their portions of stator coil 781A and 782A. In this regard, the slot 751A is defined by a pair of converging side edge members 755A and 756A, extending radially inwardly toward one another and a curved base edge member 757A extending between the side edge members 755A and 756A.

Considering now the mover assembly 712A in greater detail, the mover assembly 712A is similar to over assembly 12A except that it includes only the single slug group 726A as opposed to a pair of spaced apart slug groups. Therefore, mover assembly 712A will not be further described.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A linear electrodynamic machine, comprising:

stator means for defining an outer portion of a closed loop magnetic flux path;

mover means for defining an inner portion of said closed loop magnetic flux path;

said stator means each having at least one pair of spaced apart poles and a coil for carrying electrical current;

said stator poles being spaced apart opposed to one another for defining a space to complete said closed loop magnetic flux path;

axial permanent magnet means mounted to said stator means for linking the stator coils with magnetic flux; and mover means arranged for reciprocation within said space between said stator poles, said mover means having alternating ferromagnetic and non-magnetic portions;

whereby a voltage is induced in the stator coils as said mover means moves reciprocatively in said space to change the magnetic flux linking the coils.

2. A linear electrodynamic machine according to claim 1, wherein said magnet means includes a permanent magnet mounted at each of said poles.

3. A linear electrodynamic machine according to claim 1, wherein said outer and inner stator means each include a plurality of axially laminated ferromagnetic segments.

4. A linear electrodynamic machine, comprising:

stator means defining a plurality of magnetic flux paths;

said stator means further including at least one pair of stator pole means for helping to define at least one gap therebetween, said magnetic flux paths including said gap;

mover means having a plurality of laminated mover members being movably mounted within said gap for interacting electrodynamically with said magnetic flux paths;

said mover means being adapted for substantially friction free reciprocating movement relative to said stator means along a rectilinear path of travel within said gap;

magnet means disposed at said stator pole means for causing magnetic fields to be established in said stator pole means; and elongated coil means disposed on said stator pole means for carrying electrical current.

5. An electrodynamic machine, comprising:

elongated stator means having a plurality of substantially equally spaced apart pairs of coil receiving areas extending substantially the entire axial length of said stator means and a plurality of stator pole means where individual ones of the stator pole means are disposed between a corresponding pair of the coil receiving areas;

permanent air gap magnet means disposed at individual ones of said plurality of stator pole means for inducing magnetic flux therein;

a plurality of elongated stator coil means wherein individual ones of the stator coil means are mounted on individual ones of the stator pole means and in corresponding pairs of the coil receiving areas for carrying electrical current;

elongated mover means disposed within said stator means and spaced apart therefrom by an air gap distance g for coating electrodynamically with said stator means to convert energy;

said mover means and said stator means being mounted for rectilinear movement relative to one another for causing the magnetic flux induced in the individual ones of the stator poles means to vary from a minimum flux density to a maximum flux density as said mover means and said stator means move rectilinearly relative to one another along a substantially short rectilinear path of travel of distance $l_s$ from end to end within said stator means; and each one of said permanent magnet means having a sufficient thickness $h_m$ for helping to reduce the magnetic flux density induced in the individual ones of said plurality of stator pole means to a maximum flux density when individual ones of said stator pole means and individual ones of said mover pole means are opposing one another and to a minimum flux density when they are not opposing one another.

6. A linear electrodynamic machine according to claim 5, wherein said stator means includes nonmagnetic spacer means for helping to prevent magnetic flux leakage between magnetic fields traveling in said stator pole means.

7. An electrodynamic machine according to claim 5, wherein said mover means including means defining a plurality of radially extending slots for helping to substantially reduce eddy current in said mover means.

8. An electrodynamic machine according to claim 5, wherein said stator pole means extends along substantially the entire axial length of said stator means.

9. An electrodynamic machine according to claim 8, wherein said plurality of laminated stator members are each C-shaped.

10. An electrodynamic machine according to claim 8, wherein said plurality of laminated stator members are each. U-shaped.

11. A method of constructing an electrodynamic machine comprising:

assembling a stator core having a hollow interior with a plurality of stator poles and a plurality of coil receiving spaces disposed within said interior;

disposing a set of at least two axially aligned magnets having associated polarities at each one of said plurality of stator poles;

alternating axially the polarity of each magnet in said set;

assembling a mover;

assembling a plurality of stator coils for mounting on individual ones of said plurality of stator poles, where each individual stator coil has an opening dimensioned for receiving therein an individual one of the stator poles;

moving an assembled stator coil inwardly into the central portion of the hollow interior of said stator core;

positioning the last mentioned stator coil with its opening opposite one of the stator poles;

moving the last mentioned stator coil radially outwardly from the central portion of the stator core interior a sufficient distance to be received substantially completely on the last mentioned stator pole;

repeating the steps of moving an assembled stator coil, positioning and moving the last mentioned stator coil until an individual stator coil has been mounted on each individual one of the stator poles; and connecting electrically the mounted stator coils.

12. A method according to claim 11, wherein said step at assembly a stator core includes:

using a plurality of substantially similar stator core laminations having a desired thickness;

stacking a given quantity of individual ones of said plurality of stator core laminations to form the stator core; and securing the given quantity of stator core laminations together to fix the stator core as a unit.

13. A method according to claim 11, wherein said step of assembling a mover core includes:

using a plurality of substantially similarly mover core laminations having a desired thickness using a substantially non-magnetic spacer;

stacking a given quantity of individual ones of said plurality of mover core laminations to form a slug group;

repeating the stacking step to form another slug group;

stacking said non-magnetic spacers between the slug groups; and securing the slug groups and spacers together to form the mover core.

* * * * *